United States Patent
Kekre et al.

(10) Patent No.: US 7,386,693 B1
(45) Date of Patent: *Jun. 10, 2008

(54) FLEXIBLE HIERARCHY OF RELATIONSHIPS AND OPERATIONS IN DATA VOLUMES

(75) Inventors: Anand A. Kekre, Pune (IN); John A. Colgrove, Los Altos, CA (US); Oleg Kiselev, Palo Alto, CA (US); Ronald S. Karr, Palo Alto, CA (US); Niranjan S. Pendharkar, Pune (IN)

(73) Assignee: Symantec Operating Corporation, Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 11/514,464

(22) Filed: Sep. 1, 2006

Related U.S. Application Data

(63) Continuation of application No. 10/610,603, filed on Jul. 1, 2003, now Pat. No. 7,103,737.

(51) Int. Cl.
*G06F 12/16* (2006.01)

(52) U.S. Cl. .................. 711/161; 707/204
(58) Field of Classification Search .......... 711/161; 707/204
See application file for complete search history.

(56) References Cited

U.S. PATENT DOCUMENTS

2003/0158834 A1* 8/2003 Sawdon et al. ............. 707/1

* cited by examiner

*Primary Examiner*—Donald Sparks
*Assistant Examiner*—Jared I Rutz
(74) *Attorney, Agent, or Firm*—Campbell Stephenson LLP

(57) ABSTRACT

Disclosed is an apparatus or method performed by a computer system for creating a hierarchy of data volumes. Each data volume in the hierarchy is a point-in-time (PIT) copy of another data volume in the hierarchy or a PIT copy of a data volume V. In one embodiment of the apparatus or method, the contents of a first data volume in the hierarchy can be refreshed to the contents of a second data volume in the hierarchy such that the first data volume becomes a PIT copy of the second data volume. Before the first data volume is fully refreshed to the contents of the second data volume, data of the first data volume can be read or modified.

12 Claims, 18 Drawing Sheets

FIG. 3A

| n | $V_n$ | $M_n$ |
|---|---|---|
| 1 | 1 | 0 |
| 2 | 1 | 0 |
| 3 | 1 | 0 |
| 4 | 1 | 0 |
| 5 | 1 | 0 |
| 6 | 1 | 0 |
| ⋮ | | |
| $n_{max}$ | 1 | 0 |

26

| n | $V_n$ | $M_n$ |
|---|---|---|
| 1 | 0 | 0 |
| 2 | 0 | 0 |
| 3 | 0 | 0 |
| 4 | 0 | 0 |
| 5 | 0 | 0 |
| 6 | 0 | 0 |
| ⋮ | | |
| $n_{max}$ | 0 | 0 |

30(1)

| n | $V_n$ | $M_n$ |
|---|---|---|
| 1 | 0 | 0 |
| 2 | 0 | 0 |
| 3 | 0 | 0 |
| 4 | 0 | 0 |
| 5 | 0 | 0 |
| 6 | 0 | 0 |
| ⋮ | | |
| $n_{max}$ | 0 | 0 |

| n | $V_n$ | $M_n$ |
|---|---|---|
| 1 | 1 | 1 |
| 2 | 1 | 0 |
| 3 | 1 | 0 |
| 4 | 1 | 0 |
| 5 | 1 | 0 |
| 6 | 1 | 0 |
| ⋮ | | |
| $n_{max}$ | 1 | 0 |

26

| n | $V_n$ | $M_n$ |
|---|---|---|
| 1 | 0 | 0 |
| 2 | 0 | 0 |
| 3 | 0 | 0 |
| 4 | 0 | 0 |
| 5 | 0 | 0 |
| 6 | 0 | 0 |
| ⋮ | | |
| $n_{max}$ | 0 | 0 |

30(1)

| n | $V_n$ | $M_n$ |
|---|---|---|
| 1 | 1 | 0 |
| 2 | 0 | 0 |
| 3 | 0 | 0 |
| 4 | 0 | 0 |
| 5 | 0 | 0 |
| 6 | 0 | 0 |
| ⋮ | | |
| $n_{max}$ | 0 | 0 |

| n | $V_n$ | $M_n$ |
|---|---|---|
| 1 | 1 | 1 |
| 2 | 1 | 0 |
| 3 | 1 | 0 |
| 4 | 1 | 0 |
| 5 | 1 | 0 |
| 6 | 1 | 0 |
| ⋮ | | |
| $n_{max}$ | 1 | 0 |

26

| n | $V_n$ | $M_n$ |
|---|---|---|
| 1 | 0 | 0 |
| 2 | 0 | 0 |
| 3 | 0 | 0 |
| 4 | 0 | 0 |
| 5 | 0 | 0 |
| 6 | 0 | 0 |
| ⋮ | | |
| $n_{max}$ | 0 | 0 |

30(1)

| n | $V_n$ | $M_n$ |
|---|---|---|
| 1 | 1 | 1 |
| 2 | 0 | 0 |
| 3 | 0 | 0 |
| 4 | 0 | 0 |
| 5 | 0 | 0 |
| 6 | 0 | 0 |
| ⋮ | | |
| $n_{max}$ | 0 | 0 |

| n | $V_n$ | $M_n$ |
|---|---|---|
| 1 | 1 | 0 |
| 2 | 1 | 0 |
| 3 | 1 | 0 |
| 4 | 1 | 0 |
| 5 | 1 | 0 |
| 6 | 1 | 0 |
| ⋮ | | |
| $n_{max}$ | 1 | 0 |

26

| n | $V_n$ | $M_n$ |
|---|---|---|
| 1 | 1 | 1 |
| 2 | 1 | 0 |
| 3 | 1 | 0 |
| 4 | 1 | 0 |
| 5 | 1 | 0 |
| 6 | 1 | 0 |
| ⋮ | | |
| $n_{max}$ | 1 | 0 |

30(1)

| n | $V_n$ | $M_n$ |
|---|---|---|
| 1 | 1 | 1 |
| 2 | 0 | 0 |
| 3 | 0 | 0 |
| 4 | 0 | 0 |
| 5 | 0 | 0 |
| 6 | 0 | 0 |
| ⋮ | | |
| $n_{max}$ | 0 | 0 |

32(1,1)

| n | $V_n$ | $M_n$ |
|---|---|---|
| 1 | 0 | 0 |
| 2 | 0 | 0 |
| 3 | 0 | 0 |
| 4 | 0 | 0 |
| 5 | 0 | 0 |
| 6 | 0 | 0 |
| ⋮ | | |
| $n_{max}$ | 0 | 0 |

30(2)

| n | $V_n$ | $M_n$ |
|---|---|---|
| 1 | 0 | 0 |
| 2 | 0 | 0 |
| 3 | 0 | 0 |
| 4 | 0 | 0 |
| 5 | 0 | 0 |
| 6 | 0 | 0 |
| ⋮ | | |
| $n_{max}$ | 0 | 0 |

| n | $V_n$ | $M_n$ |
|---|---|---|
| 1 | 1 | 0 |
| 2 | 1 | 1 |
| 3 | 1 | 0 |
| 4 | 1 | 0 |
| 5 | 1 | 0 |
| 6 | 1 | 0 |
| ⋮ | | |
| $n_{max}$ | 1 | 0 |

26

| n | $V_n$ | $M_n$ |
|---|---|---|
| 1 | 1 | 1 |
| 2 | 1 | 0 |
| 3 | 1 | 0 |
| 4 | 1 | 0 |
| 5 | 1 | 0 |
| 6 | 1 | 0 |
| ⋮ | | |
| $n_{max}$ | 1 | 0 |

30(1)

| n | $V_n$ | $M_n$ |
|---|---|---|
| 1 | 1 | 1 |
| 2 | 1 | 0 |
| 3 | 0 | 0 |
| 4 | 0 | 0 |
| 5 | 0 | 0 |
| 6 | 0 | 0 |
| ⋮ | | |
| $n_{max}$ | 0 | 0 |

32(1,1)

| n | $V_n$ | $M_n$ |
|---|---|---|
| 1 | 0 | 0 |
| 2 | 0 | 0 |
| 3 | 0 | 0 |
| 4 | 0 | 0 |
| 5 | 0 | 0 |
| 6 | 0 | 0 |
| ⋮ | | |
| $n_{max}$ | 0 | 0 |

30(2)

| n | $V_n$ | $M_n$ |
|---|---|---|
| 1 | 0 | 0 |
| 2 | 1 | 0 |
| 3 | 0 | 0 |
| 4 | 0 | 0 |
| 5 | 0 | 0 |
| 6 | 0 | 0 |
| ⋮ | | |
| $n_{max}$ | 0 | 0 |

| n | $V_n$ | $M_n$ | 26 |
|---|---|---|---|
| 1 | 1 | 0 | |
| 2 | 1 | 1 | |
| 3 | 1 | 0 | |
| 4 | 1 | 0 | |
| 5 | 1 | 0 | |
| 6 | 1 | 0 | |
| $n_{max}$ | 1 | 0 | |

| n | $V_n$ | $M_n$ | 30(1) |
|---|---|---|---|
| 1 | 1 | 1 | |
| 2 | 1 | 0 | |
| 3 | 1 | 0 | |
| 4 | 1 | 0 | |
| 5 | 1 | 0 | |
| 6 | 1 | 0 | |
| $n_{max}$ | 1 | 0 | |

| n | $V_n$ | $M_n$ | 32(1,1) |
|---|---|---|---|
| 1 | 1 | 1 | |
| 2 | 1 | 0 | |
| 3 | 0 | 0 | |
| 4 | 0 | 0 | |
| 5 | 0 | 0 | |
| 6 | 0 | 0 | |
| $n_{max}$ | 0 | 0 | |

| n | $V_n$ | $M_n$ | 32(1,2) |
|---|---|---|---|
| 1 | 0 | 0 | |
| 2 | 0 | 0 | |
| 3 | 0 | 0 | |
| 4 | 0 | 0 | |
| 5 | 0 | 0 | |
| 6 | 0 | 0 | |
| $n_{max}$ | 0 | 0 | |

| n | $V_n$ | $M_n$ | 30(2) |
|---|---|---|---|
| 1 | 0 | 0 | |
| 2 | 0 | 0 | |
| 3 | 0 | 0 | |
| 4 | 0 | 0 | |
| 5 | 0 | 0 | |
| 6 | 0 | 0 | |
| $n_{max}$ | 0 | 0 | |

| n | $V_n$ | $M_n$ | 32(2,1) |
|---|---|---|---|
| 1 | 0 | 0 | |
| 2 | 1 | 0 | |
| 3 | 0 | 0 | |
| 4 | 0 | 0 | |
| 5 | 0 | 0 | |
| 6 | 0 | 0 | |
| $n_{max}$ | 0 | 0 | |

| n | $V_n$ | $M_n$ | 32(2,2) |
|---|---|---|---|
| 1 | 0 | 0 | |
| 2 | 0 | 0 | |
| 3 | 0 | 0 | |
| 4 | 0 | 0 | |
| 5 | 0 | 0 | |
| 6 | 0 | 0 | |
| $n_{max}$ | 0 | 0 | |

FIG. 10B

| n | $V_n$ | $M_n$ | 26 |
|---|---|---|---|
| 1 | 1 | 0 | |
| 2 | 1 | 1 | |
| 3 | 1 | 0 | |
| 4 | 1 | 0 | |
| 5 | 1 | 0 | |
| 6 | 1 | 0 | |
| $n_{max}$ | 1 | 0 | |

| n | $V_n$ | $M_n$ | 30(1) |
|---|---|---|---|
| 1 | 1 | 1 | |
| 2 | 1 | 0 | |
| 3 | 1 | 0 | |
| 4 | 1 | 0 | |
| 5 | 1 | 0 | |
| 6 | 1 | 0 | |
| $n_{max}$ | 1 | 0 | |

| n | $V_n$ | $M_n$ | 32(1,1) |
|---|---|---|---|
| 1 | 1 | 1 | |
| 2 | 1 | 0 | |
| 3 | 0 | 0 | |
| 4 | 0 | 0 | |
| 5 | 0 | 0 | |
| 6 | 0 | 0 | |
| $n_{max}$ | 0 | 0 | |

| n | $V_n$ | $M_n$ | 32(1,2) |
|---|---|---|---|
| 1 | 0 | 0 | |
| 2 | 0 | 0 | |
| 3 | 0 | 0 | |
| 4 | 0 | 0 | |
| 5 | 0 | 0 | |
| 6 | 0 | 0 | |
| $n_{max}$ | 0 | 0 | |

| n | $V_n$ | $M_n$ | 30(2) |
|---|---|---|---|
| 1 | 0 | 0 | |
| 2 | 0 | 0 | |
| 3 | 0 | 0 | |
| 4 | 0 | 0 | |
| 5 | 0 | 0 | |
| 6 | 0 | 0 | |
| $n_{max}$ | 0 | 0 | |

| n | $V_n$ | $M_n$ | 32(2,1) |
|---|---|---|---|
| 1 | 0 | 0 | |
| 2 | 1 | 0 | |
| 3 | 1 | 1 | |
| 4 | 0 | 0 | |
| 5 | 0 | 0 | |
| 6 | 0 | 0 | |
| $n_{max}$ | 0 | 0 | |

| n | $V_n$ | $M_n$ | 32(2,2) |
|---|---|---|---|
| 1 | 0 | 0 | |
| 2 | 0 | 0 | |
| 3 | 1 | 0 | |
| 4 | 1 | 1 | |
| 5 | 0 | 0 | |
| 6 | 0 | 0 | |
| $n_{max}$ | 0 | 0 | |

| n | $V_n$ | $M_n$ | | n | $V_n$ | $M_n$ | | n | $V_n$ | $M_n$ | | n | $V_n$ | $M_n$ | |
|---|---|---|---|---|---|---|---|---|---|---|---|---|---|---|---|
| | | | ⌐26 | | | | ⌐30(1) | | | | ⌐32(1,1) | | | | ⌐32(1,2) |
| 1 | 1 | 0 | | 1 | 1 | 1 | | 1 | 1 | 0 | | 1 | 0 | 0 | |
| 2 | 1 | 1 | | 2 | 1 | 0 | | 2 | 1 | 0 | | 2 | 0 | 0 | |
| 3 | 1 | 0 | | 3 | 1 | 0 | | 3 | 0 | 0 | | 3 | 0 | 0 | |
| 4 | 1 | 0 | | 4 | 1 | 0 | | 4 | 0 | 0 | | 4 | 0 | 0 | |
| 5 | 1 | 0 | | 5 | 1 | 0 | | 5 | 0 | 0 | | 5 | 0 | 0 | |
| 6 | 1 | 0 | | 6 | 1 | 0 | | 6 | 0 | 0 | | 6 | 0 | 0 | |
| ⋮ | | | | ⋮ | | | | ⋮ | | | | ⋮ | | | |
| $n_{max}$ | 1 | 0 | | $n_{max}$ | 1 | 0 | | $n_{max}$ | 0 | 0 | | $n_{max}$ | 0 | 0 | |

| n | $R_n$ | | n | $V_n$ | $M_n$ | | n | $V_n$ | $M_n$ | | n | $V_n$ | $M_n$ | |
|---|---|---|---|---|---|---|---|---|---|---|---|---|---|---|
| | | ⌐150 | | | | ⌐30(2) | | | | ⌐32(2,1) | | | | ⌐32(2,2) |
| 1 | 0 | | 1 | 0 | 0 | | 1 | 1 | 0 | | 1 | 1 | 0 | |
| 2 | 0 | | 2 | 0 | 0 | | 2 | 1 | 1 | | 2 | 1 | 0 | |
| 3 | 1 | | 3 | 0 | 0 | | 3 | 0 | 0 | | 3 | 1 | 0 | |
| 4 | 0 | | 4 | 0 | 0 | | 4 | 0 | 0 | | 4 | 1 | 1 | |
| 5 | 0 | | 5 | 0 | 0 | | 5 | 1 | 0 | | 5 | 0 | 0 | |
| 6 | 0 | | 6 | 0 | 0 | | 6 | 1 | 0 | | 6 | 0 | 0 | |
| ⋮ | | | ⋮ | | | | ⋮ | | | | ⋮ | | | |
| $n_{max}$ | 0 | | $n_{max}$ | 0 | 0 | | $n_{max}$ | 1 | 0 | | $n_{max}$ | 0 | 0 | |

*FIG. 10G*

U.S. Pat. No. 7,386,693 B1

FLEXIBLE HIERARCHY OF RELATIONSHIPS AND OPERATIONS IN DATA VOLUMES

CROSS-REFERENCE TO RELATED APPLICATIONS

The present application is a continuation of U.S. patent application Ser. No. 10/610,603, filed on Jul. 1, 2003 now U.S. Pat. No. 7,103,737, entitled "FLEXIBLE HIERARCHY OF RELATIONSHIPS AND OPERATIONS IN DATA VOLUMES" and is incorporated by reference herein in its entirety and for all purposes.

BACKGROUND OF THE INVENTION

Many businesses rely on large scale data processing systems for storing and processing data. This data is typically stored as a volume of data in one or more memory devices. Businesses often seek to create one or more copies of the data volume for various purposes. Creating a copy of the data volume is a procedure well known in the art. In essence, the procedure includes copying data from memory that stores the data volume to memory for storing a copy of the data volume until the entire content of the data volume is copied. While the data volume is being copied, write and/or read access to data is denied until the entire contents of the data volume is copied.

SUMMARY OF THE INVENTION

Disclosed is an apparatus or method performed by a computer system for creating a hierarchy of data volumes. Each data volume in the hierarchy is a point-in-time (PIT) copy of another data volume in the hierarchy or a PIT copy of a data volume V. In one embodiment of the apparatus or method, the contents of a first data volume in the hierarchy can be refreshed to the contents of a second data volume in the hierarchy such that the first data volume becomes a PIT copy of the second data volume. Before the first data volume is fully refreshed to the contents of the second data volume, data of the first data volume can be read or modified.

BRIEF DESCRIPTION OF THE DRAWINGS

The present invention may be better understood, and its numerous objects, features, and advantages made apparent to those skilled in the art by referencing the accompanying drawings.

FIG. 3A illustrates Valid/Modified (VM) maps created by the host node shown in FIG. 1;

FIG. 3B illustrates VM maps of FIG. 3A after modification of data in the primary data volume;

FIG. 3C illustrates VM maps of FIG. 3B after modification of data in the point-in-time (PIT) copy of primary data volume;

FIG. 7A illustrates VM maps created by the host node shown in FIG. 1 in addition to the VM maps of FIG. 3C;

FIG. 7B illustrates the VM maps of FIG. 7A after modification of data in the primary data volume;

FIG. 10A illustrates VM maps created by the host node shown in FIG. 1 in addition to the VM maps of FIG. 7B;

FIG. 10B illustrates the VM maps of FIG. 10A after modification of data of several data volumes in the hierarchy;

FIG. 10C illustrates the VM maps of FIG. 10B after preconditioning a data volume of the hierarchy and after generation of a refresh map;

FIG. 10D illustrates the VM maps of FIG. 10C after modification of the refresh map;

FIG. 10E illustrates the VM maps of FIG. 10D after encoding the VM map corresponding to a data volume to be refreshed;

FIG. 10F illustrates the VM maps of FIG. 10E after modification thereof;

FIG. 10G illustrates the VM maps of FIG. 10F after modification thereof;

The use of the same reference symbols in different drawings indicates similar or identical items.

DETAILED DESCRIPTION

Figure 1:
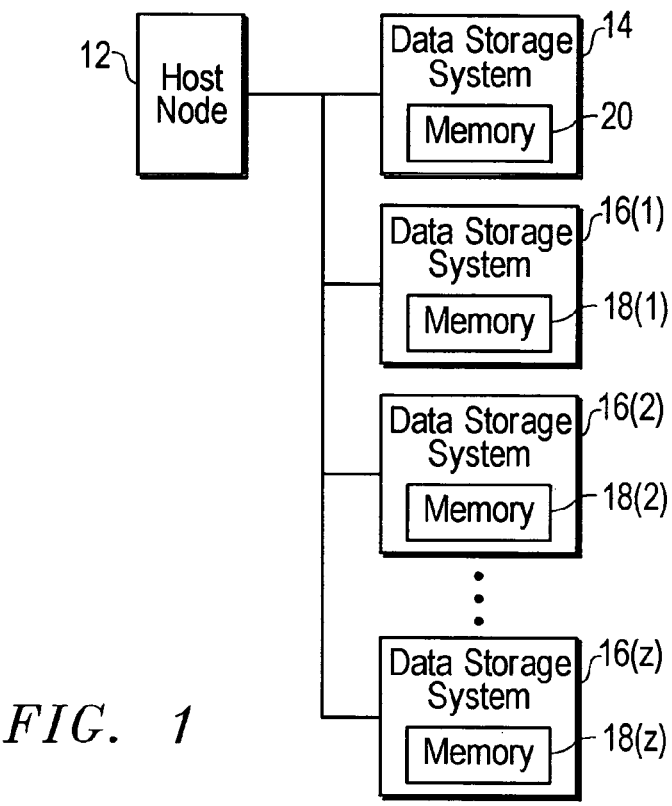
FIG. 1 is a block diagram of a data processing system.

FIG. 1 illustrates (in block diagram form) relevant components of a data processing system 10 employing one embodiment of the present invention. Data processing system 10 includes a host node 12 coupled to data storage systems 14 and 16(1)-16(z). Although host node 12 is shown coupled directly to data storage systems 14 and 16(1)-16(z), host node 12, in an alternative embodiment, may be indirectly coupled to one or more of the data storage systems 14 and 16(1)-16(z) via an intervening third device. For purposes of explanation, host node 12 will be described as having direct access to data storage systems 14 and 16(1)-16(z).

Each of the data storage systems 14 and 16(1)-16(z) includes memories 20 and 18(1)-18(z), respectively, for storing data. Each of these data memories may take form in one or more dynamic or static random access memories, one or more arrays of magnetic or optical data storage disks, or combinations thereof. The data memories 20 and 18(1)-18

(z) should not be limited to the foregoing hardware components; rather, these memories may take form in any hardware, software, or combination of hardware and software in which data may be persistently stored and accessed. The data memories may take form in a complex construction of several hardware components operating under the direction of software. The data memories may take form in mirrored hardware. It is further noted that the present invention may find use with many types of redundancy/reliability systems. For example, the present invention may be used with a redundant array of independent disks (RAID) that store volume data. Moreover, the present invention should not be limited to use in connection with the host node of a data processing system. The present invention may find use in a storage switch of a storage area network or in any of many distinctive appliances that can be used in a data storage system.

Data memory 20 stores a primary data volume V. As will be more full described below, the primary data volume V is the working data volume of data processing system 10. Host node 12 may include a computer system (e.g., server computer system) that processes requests received from client computer systems (not shown) to perform a data transaction on the primary data volume V. Host node 12 generates read or write-data transactions that access the primary data volume V in memory 20 in response to receiving requests from client computer systems. Write-data transactions write new data to memory or modify (i.e., overwrite) existing data stored in memory.

Host node 12 can create and store in data memories 18(1)-18(z) a hierarchy of data volumes directly or indirectly related to the primary data volume V. As will be more fully described below, each data volume of the hierarchy is a point-in-time (PIT) or modified PIT copy of either the primary data volume V or another data volume in the hierarchy. Each data volume of the hierarchy will be described below as a PIT copy of another data volume, it being understood that the term PIT copy includes modified PIT copy. For ease of explanation, the present invention will be described, except where noted otherwise, with reference to a hierarchy consisting of a two-dimensional array of data volumes V(1,1)-V(x,y). In this exemplary two-dimensional array, each data volume V(1,y) is a PIT copy of the primary data volume V, while each data volume V(x,y+1) is PIT copy of data volume V(x,y).

Each of the data memories 18(1)-18(z) stores or can be configured to store one or more data volumes of the hierarchy. Moreover, each data volume of the hierarchy may be stored in distributed fashion in two or more of the memories 18(1)-18(z). Host node 12 can generate read or write-data transactions for accessing any of data volumes of the hierarchy stored in memories 18(1)-18(z). As will be more fully described below, each of the memories 18(1)-18(z) is presumed to store a single data volume of the hierarchy, it being understood that the present invention should not be limited thereto.

Host node 12 may include a memory for storing instructions that, when executed by host node 12, implement one embodiment of the present invention. Host node 12 may also include a data storage management system (not shown) that takes form in software instructions executing on or more processors (not shown). The data management system includes, in one embodiment, a file system, a system for creating data volumes, and a system for managing the distribution of data of a volume across one or more memory devices. Volume Manager™ provided by VERITAS Software Corporation of Mountain View, Calif., is an exemplary system for managing the distribution of data of a volume across one or more memory devices. Volume and disk management products from other product software companies also provide a system for managing the distribution of volume data across multiple memory devices. Hardware RAID adapter cards and RAID firmware built into computer systems can also provide this function.

Figure 2:
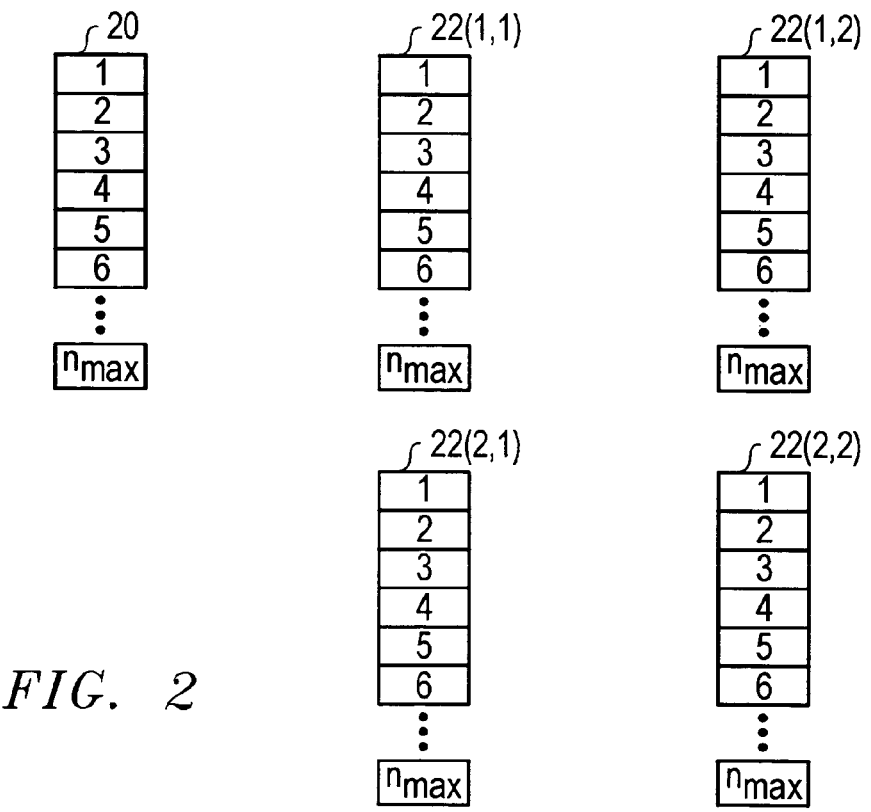
FIG. 2 shows block diagrams illustrating memory structures of the data storage systems shown in FIG. 2.

The data storage management system of host node 12 can allocate unused memory for storing the contents of a data volume. FIG. 2 represents exemplary memory structures (memories) allocated by host node 12 to store the primary data volume V and several data volumes of the aforementioned data volume hierarchy. More particularly, FIG. 2 shows memory 20 for storing the primary data volume V. FIG. 2 also shows memories 22(1,1), 22(2,2), 22(1,2), and 22 (2,2) for storing data volumes V(1,1), V(2,2), V(1,2), V(2,2), respectively. As will be more fully described below, volumes V(1,1) and V(2,2) are PIT copies of primary data volume V, Volume V(1,2) is a PIT copy of data volume V(1,1), and volume V(2,2) is a PIT copy of data volume V(2,2). Although not shown, additional data volumes may be included in the hierarchy. For example, the hierarchy may include a second PIT copy of volume (2,1) in addition to volume V(2,2), or the hierarchy may include volume V(2,3), a PIT copy of volume V(2,2).

Each memory in FIG. 2 is shown having $n_{max}$ memory blocks. Each memory block may consist of an arbitrary large number of physical memory regions. The physical memory regions of a block need not be contiguous to each other. Further, the physical memory regions of a block need not be contained in only one memory device (e.g., memory device 18(2)). However, the physical memory regions of a block are viewed as logically contiguous by the data management system executing on host node 12. Moreover, the blocks of a memory (e.g., memory 22(1,1)) are viewed contiguous to each other by the data management system.

Corresponding blocks in data memories 20 and 22(1,1)-22(2,2) can be equal in size. Thus, memory block 1 of data memory 20 can be equal in size to memory block 1 of data memories 22(1,1)-22(2,2). Each of the memory blocks in data memory 20 may be equal in size to each other. Alternatively, the memory blocks in data memory 20 may vary in size.

Each of the data volumes V(1,1)-V(2,2) in the hierarchy can be virtual or real. To illustrate, data volume V(1,1) is virtual when some of its data is found within memory 20 rather than memory 22(1,1). In contrast, data volume V(1,1) is real when all of its data is stored in memory 22(1,1). A virtual data volume can be converted to a real data volume via a background data copying process performed by host node 12. In the background copying process, for example, data is copied from memory 20 to memory 22(1,1) until all data of volume V(1,1) is stored in memory 22(1,1). Contents of the data volumes in the hierarchy can be modified regardless of whether they are in the real or virtual state.

Host node 12 can create a virtual data volume according to the methods described in copending U.S. patent application Ser. No. 10/143,059 entitled, "Method and Apparatus for Creating a Virtual Data Copy," which is incorporated herein by reference in its entirety. To illustrate, when host 12 first creates data volume V(1,1), host node 12 creates at least two valid/modified (VM) maps such as VM map 26 and VM map 32(1,1) represented in FIG. 3A. VM map 26 corresponds to memory 20 while VM map 32(1,1) corresponds to memory 22(1,1). Host node 12 may also create a third VM map 30(1) when virtual data volume V(1,1) is created. It is noted that in an alternative, host node 12 may create VM map 30(1) when host node 12 creates a subsequent PIT copy (e.g., volume V(2,2)) of the primary data volume V. Use of VM map 32(1,1) will be more fully described below. Each of the VM maps shown within FIG. 3A may be persistently stored in memory of host node 12 or elsewhere.

VM maps 26 and 32(1,1) may include $n_{max}$ entries of two bits each as shown in the embodiment of FIG. 3A. Each entry n of VM map 26 corresponds to a respective block n in memory 20, while each entry n of VM map 32(1,1) corresponds to a respective block n of memory 22(1,1). The first and second bits in each entry are designated $V_n$ and $M_n$, respectively. In one embodiment, $V_n$ in each entry, depending upon its state, indicates whether its corresponding memory block n contains valid data. For example, when set to logical 1, $V_2$ of VM map 26 indicates that block 2 of memory 20 contains valid primary volume data, and when set to logical 0, $V_2$ of VM map 26 indicates that block 2 of memory 20 contains no valid primary volume data. It is noted that when $V_n$ (where n is any value from 1 to $n_{max}$) is set to logical 0, its corresponding memory block n may contain data, but this data is not considered valid. In similar fashion, $V_2$ of VM map 32(1,1) when set to logical 1 indicates that block 2 of memory 22(1,1) contains a valid copy of data from block n of memory 20. On the other hand, $V_2$ of VM map 32(1,1), when set to logical 0, indicates that block 2 of memory 22(1,1) does not contain valid data.

$M_n$ in each entry of VM maps 26 and 32(1,1), depending upon its state, may indicate whether data has been modified since some point in time. For example, when set to logical 1, $M_3$ of VM 26 indicates that block 3 of memory 20 contains data that was modified via a write-data transaction since creation of the data volume V(1,1). When set to logical 0, $M_3$ of VM map 26 indicates that block 3 of memory 20 does not contain modified data. Likewise, $M_3$ in VM map 32(1,1), when set to logical 1, indicates that block 3 in memory 22(1,1) contains data that was modified via a write-data transaction since creation of the data volume V(1,1). When set to logical 0, $M_3$ of VM map 32(1,1) indicates that block 3 of memory 22(1,1) contains no modified data of volume V(1,1).

When VM map 26 is first created, $V_n$ in each entry is initially set to logical 1 thus indicating that each block n in memory 20 contains valid data of the primary volume V. Additionally, when VM map 26 is first created, $M_n$ in each entry is initially set to logical 0 thus indicating that each block n in memory 20 initially contains unmodified data. When VM maps 30(1) and 32(1,1) are first created, $V_n$ and $M_n$ in each entry are set to logical 0. Because the bits of each entry in VM map 32(1,1) are initially set to logical 0, VM map 32(1,1) indicates that memory 22(1,1) does not contain valid or modified data of volume V(1,1). Host node 12 can change the state of one or more bits in any VM map entry using a single or separate I/O operation at the memory address that stores the map entry.

Figure 4:
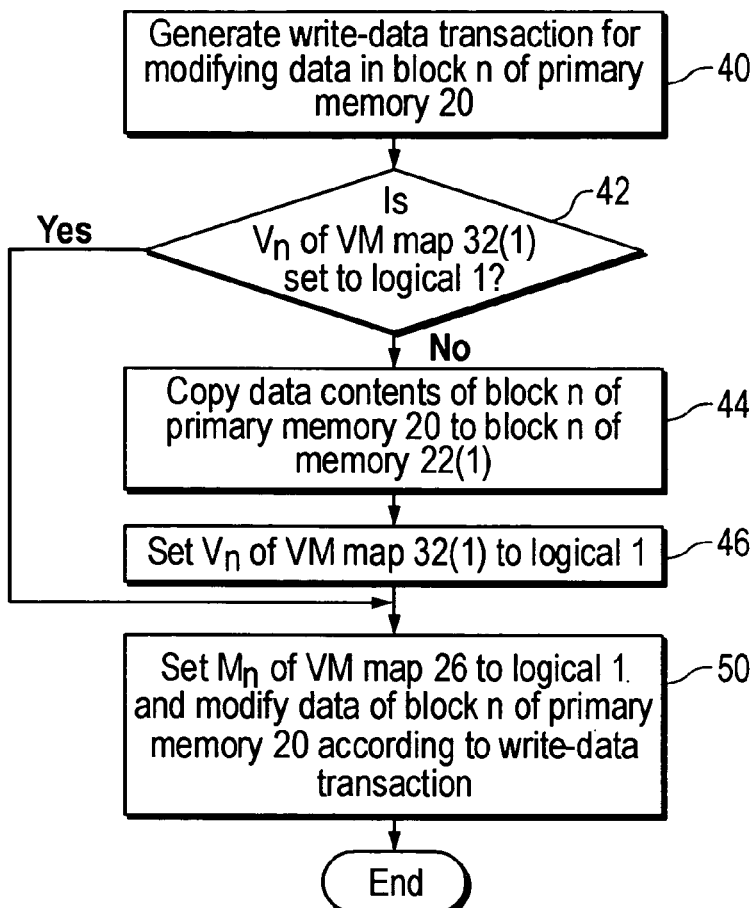
FIG. 4 is a flow chart illustrating operational aspects of writing or modifying data in the primary data volume.

Host node 12 can run a background copying process to transform any virtual data volume in the hierarchy into a real data volume. For example, host node 12 copies data of memory 20 to memory 22(1,1) in a block-by-block or blocks-by-blocks fashion until data in all unmodified blocks n-$n_{max}$ of memory 20 are copied to blocks n-$n_{max}$, respectively, of memory 22(1). When the background copying process completes, virtual data volume V(1,1) is transformed into real data volume V(1,1). However, before this background copying process is started or completed, host node 12 can modify data of the primary data volume V or any virtual copy thereof. FIG. 4 illustrates relevant operational aspects of modifying data of the primary data volume V via a write-data transaction.

The flow chart shown in FIG. 4 implements one embodiment of a copy-on-write (COW) process. The process shown in FIG. 4 starts when host node 12 generates a write-data transaction for modifying data in block n of memory 20 as shown in step 40. The write-data transaction may be generated in response to host node 12 receiving a request from a client computer system coupled thereto. Before host node 12 writes to block n, host node 12 first determines whether block n of memory 22(1,1) has a valid copy of data from block n of memory 20 as the result of either the background copying process or the completion of a previous write-data transaction directed to block n of memory 20. To make this determination, host node 12 accesses VM map 32(1,1) to determine the state of $V_n$. In step 42, if $V_n$ of VM map 32(1,1) is set to logical 0, valid data does not exist in block n of memory 22(1,1), and the process proceeds to step 44 where host 12 copies the data contents of block n of primary memory 20 to block n of memory 22(1,1). Thereafter, in step 46, host node 12 sets $V_n$ of VM map 32(1,1) to logical 1. Alternatively, steps 44 and 46 can be reversed in order.

In response to step 46 or in response to a determination in step 42 that $V_n$ is set to logical 1, host node 12 sets $M_n$ of VM map 26 to logical 1, and host node 12 modifies data of block n of primary memory 20 according to the write-data transaction of step 40. It should be noted that in step 50, data storage system 14 (not host node 12) performs the actual modification of data in memory 20 in response to receiving the write-data transaction from host node 12 via a communication link. For ease of explanation, host node 12 will be described as performing the function of modifying data in block n according to a write-data transaction. Moreover, it should be noted that less than all data in block n is modified by a write-data transaction, it being understood that the present invention should not be limited thereto.

FIG. 3B illustrates the VM maps of FIG. 3A after implementing a write-data transaction for modifying data of block 1 of the primary data volume V in accordance with the COW process shown in FIG. 4.

Figure 5:
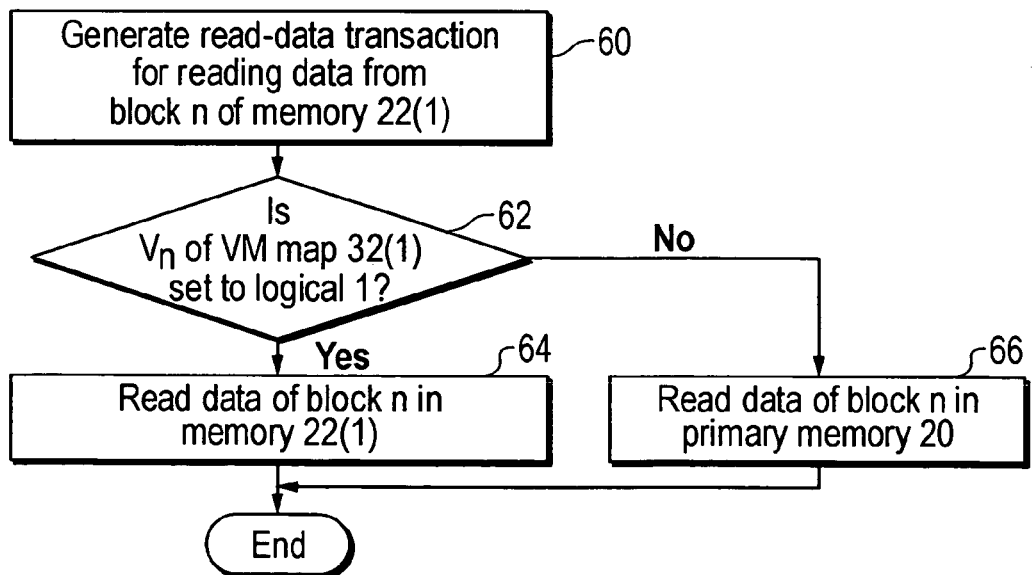
FIG. 5 is a flow chart illustrating operational aspects of reading data from memory of FIG. 1.

In addition to the ability to modify the data contents of the primary data volume V before data volume V(1,1) is transformed from the virtual state into the real state, host node 12 can read data from or modify data in volume V(1,1). FIG. 5 illustrates operational aspects of reading data from volume V(1,1). The process shown in FIG. 5 is started when host node 12 generates a read-data transaction for reading data from block n of memory 22(1,1). Host node 12 first determines whether block n of memory 22(1,1) has a valid copy of data as the result of either the background copying process or the completion of a previous write-data transaction directed to block n of memory 20. Accordingly, in step 62, host node accesses VM map 32(1,1) to determine the state of $V_n$ therein. If $V_n$ is set to logical 1, the data sought is stored in block n in memory 22(1,1) and read accordingly as shown in step 64. Otherwise, the data sought is read from block n of memory 20 as shown in step 66.

Figure 6:
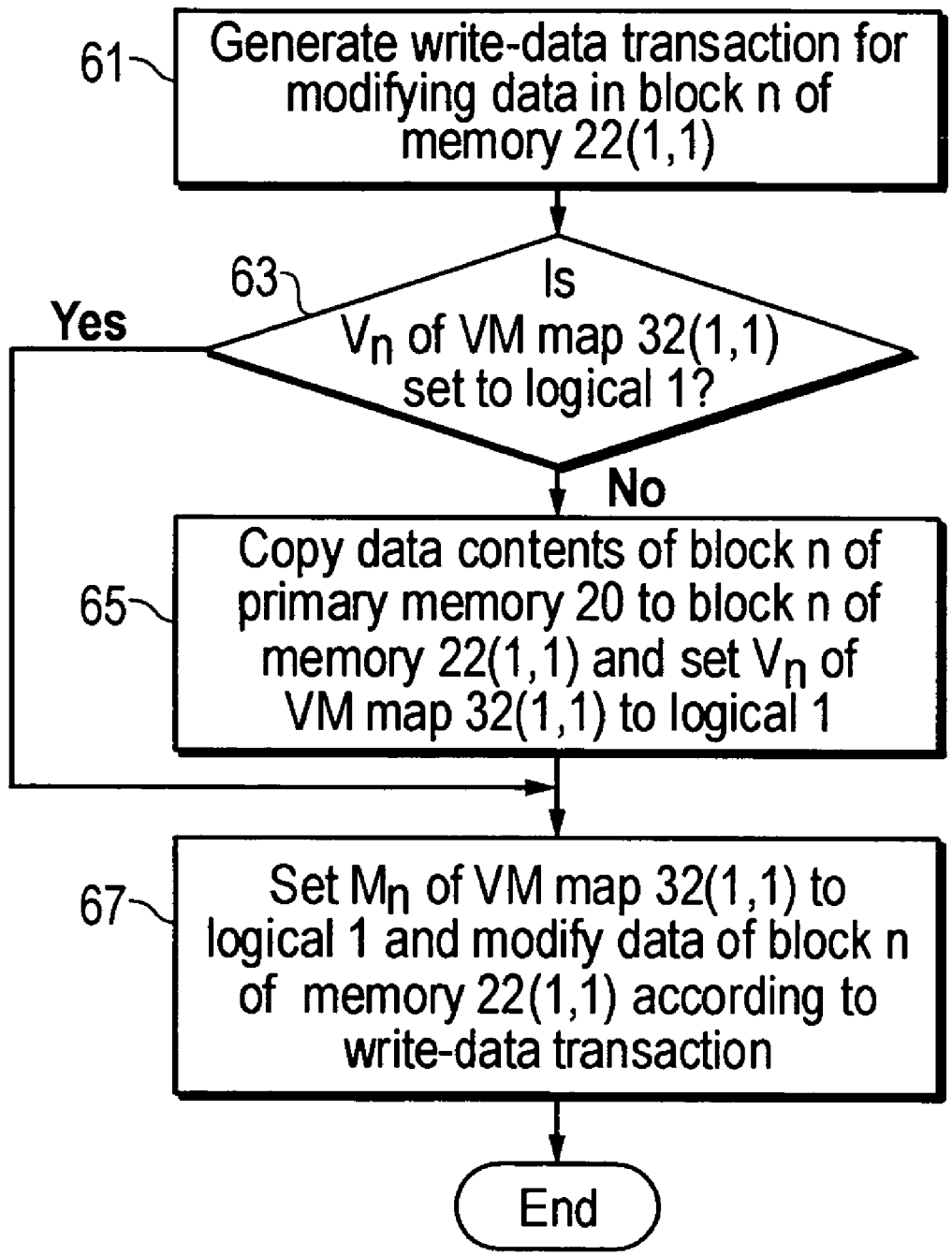
FIG. 6 is a flow chart illustrating operational aspects of modifying data in a PIT copy of the primary volume.

FIG. 6 illustrates operation aspects of modifying data of volume V(1,1) before volume V(1,1) is transformed into a real volume. In step 61 host node 12 generates a write-data transaction for modifying data in block n of memory 22(1,1). Host node 12 must first ascertain whether data sought to be modified is contained in block n of memory 22(1,1). Accordingly, in step 63, host node accesses VM map 32(1,1) to determine the state of $V_n$ therein, and if $V_n$ is set to logical 0, the data sought to be modified is not stored in block n in memory 22(1,1). In response, host node 12 copies the data contents of block n of memory 20 to block n of memory 22(1,1), and host node 12 sets $V_n$ of VM map 32(1,1) to logical 1 as shown in step 65.

If $V_n$ is set to logical 1 in step 63 or in response to execution of step 65, host node 12 sets $M_n$ (if not already set) of VM map 32(1,1) to logical 1 and subsequently modifies data of block n of memory 22(1,1) according to the write-data transaction as shown in step 67. FIG. 3C shows the VM maps of FIG. 3B after modifying data in block 1 of memory 22(1,1) according to the process of FIG. 6.

Before the first data volume V(1,1) is transformed into a real data volume, host node 12 can create additional PIT copies of the primary data volume V. Each time host node creates a PIT copy, host node 12 creates corresponding VM maps. To illustrate, when host node 12 creates data volume V(2,2) (i.e., a second virtual PIT copy of the primary data volume V), host node 12 creates VM maps 30(2) and 32(2,2) represented in FIG. 7A. With reference to FIG. 2, VM map 30(2) corresponds to memory 20 while VM map 32(2,2) corresponds to memory 22(2,2). It is noted that in an alternative embodiment, VM map 30(2) may be created when a subsequent PIT copy (e.g., data volume V(3)) of the primary data volume V is created.

Newly created VM maps 30(2) and 32(2,1) include $n_{max}$ entries of two bits each as shown in the embodiment of FIG. 7A. Each entry of VM map 30(2) corresponds to a respective block n in memory 20, while each entry of VM map 32(2,1) corresponds to a respective block n of memory 22(2,1). The first and second bits in each entry are designated $V_n$ and $M_n$, respectively. $V_n$ in each entry of VM map 32(2,1), depending upon its state, indicates whether its corresponding memory block n contains a valid copy of data from block n of memory 20. For example, $V_2$ of VM map 32(2,1) when set to logical 1 indicates that block 2 of memory 22(2,1) contains valid data copied from memory 20. On the other hand, $V_2$ of VM map 32(2,1), when set to logical 0, indicates that block 2 of memory 22(2,1) does not contain valid data.

$M_n$ in each entry of VM map 32(2,1), depending upon its state, indicates whether data of block n has been modified since some point in time. For example, $M_3$ in VM map 32(2,1), when set to logical 1, indicates that block 3 in memory 22(2,1) contains data that was modified via a write-data transaction after creation of the second virtual data volume V(2,1). When set to logical 0, $M_3$ of VM map 32(2,1) indicates that block 3 of memory 22(2,1) contains no modified data of volume V(2,1).

When VM maps 30(2) and 32(2,1) are first created, $V_n$ and $M_n$ in each entry are set to logical 0. Because the bits of each entry in VM map 32(2,1) are initially set to logical 0, VM map 32(2,1) indicates that memory 22(2,1) does not contain valid or modified data. Host node 12 can change the state of one or more bits in each VM map entry using a single or separate I/O operation at the memory address that stores the map entry.

Figure 8:
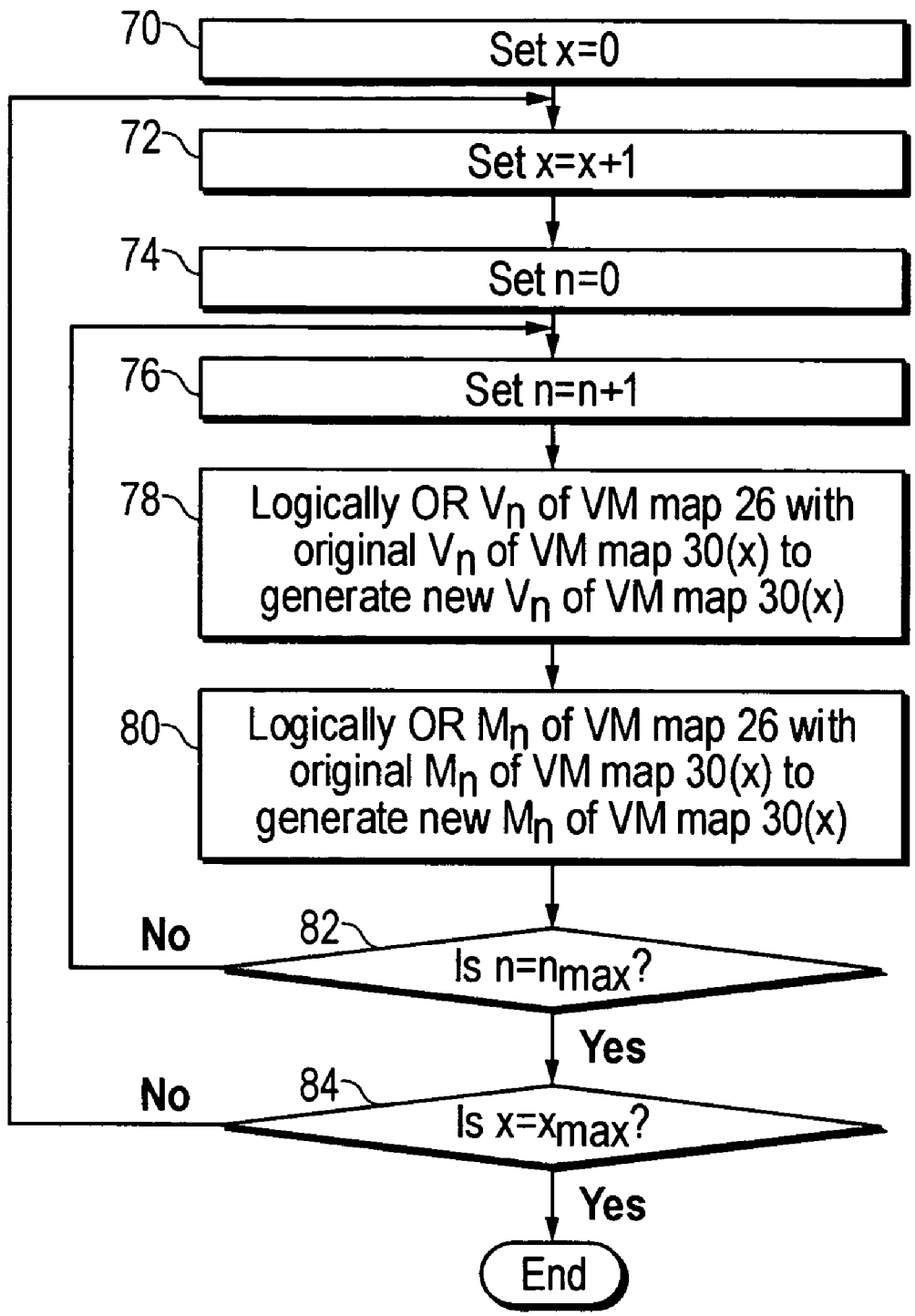
FIG. 8 is a flow chart illustrating operational aspects of copying one VM map into another VM map.

Each time a PIT copy of the primary volume V is created, the contents of the VM map 26 are copied into each VM map 30 in existance. FIG. 8 illustrates the operational aspects of copying the VM map 26 into existing VM maps 30(1)-30($x_{max}$) when a PIT copy of the primary volume is newly created. The process initiates in step 70 when host node 12 sets a variable x to 0. Thereafter, in step 72, host node 12 increments x by 1. In step 74 host node 12 sets variable n to 0, and in step 76 host node 12 increments n by 1.

In step 78, host node 12 logically ORs $V_n$ of VM map 26 with the original $V_n$ of VM map 30(x) to generate a new $V_n$. Host node 12 overwrites the original $V_n$ of map 30(x) with the new $V_n$. In step 80, host node 12 logically ORs $M_n$ of VM map 26 with the original $M_n$ of VM map 30(x) to generate a new $M_n$. Host node 12 overwrites the original $M_n$ of map 30(x) with the new $M_n$. Thereafter, in step 82, host node 12 compares the current value of n with $n_{max}$. If these two values are not equal, steps 76-80 are repeated.

Eventually, n will equal $n_{max}$, and host node in step 84, compares the current value of x with $x_{max}$ where $x_{max}$ is the number of PIT copies of the primary data volume V existing before creation of a new PIT of the primary volume V. If x does not equal $x_{max}$, then steps 72-82 are repeated. Eventually, x will equal $x_{max}$ and the process ends. After VM map 26 is copied into each VM map 30, host node 12 clears each of the $M_n$ bits in VM map 26.

FIG. 7A shows the state of VM map 26 and VM map 30(1) after the contents of VM map 26 have been copied into VM map 30(1) in accordance with the process of FIG. 8 and after the $M_n$ bits of the VM map 26 have been cleared to logical 0. By copying the contents of VM map 26 into VM map 30(1), VM map 30(1) records the state of VM map 26 at the time data volume V(2,1) is created. Each $M_n$ bit in VM map 26 now indicates whether its corresponding block n in memory 20 has been modified since the creation of data volume V(2,1). A logical ORing of the $M_n$ bits in VM maps 26 and 30(1) indicates whether corresponding block n in memory 20 has been modified since the creation of data volume V(1,1). In one sense, VM map 30(1) is transformed into a map that relates changes of the primary data volume V relative to data volume V(1,1).

Figure 9:
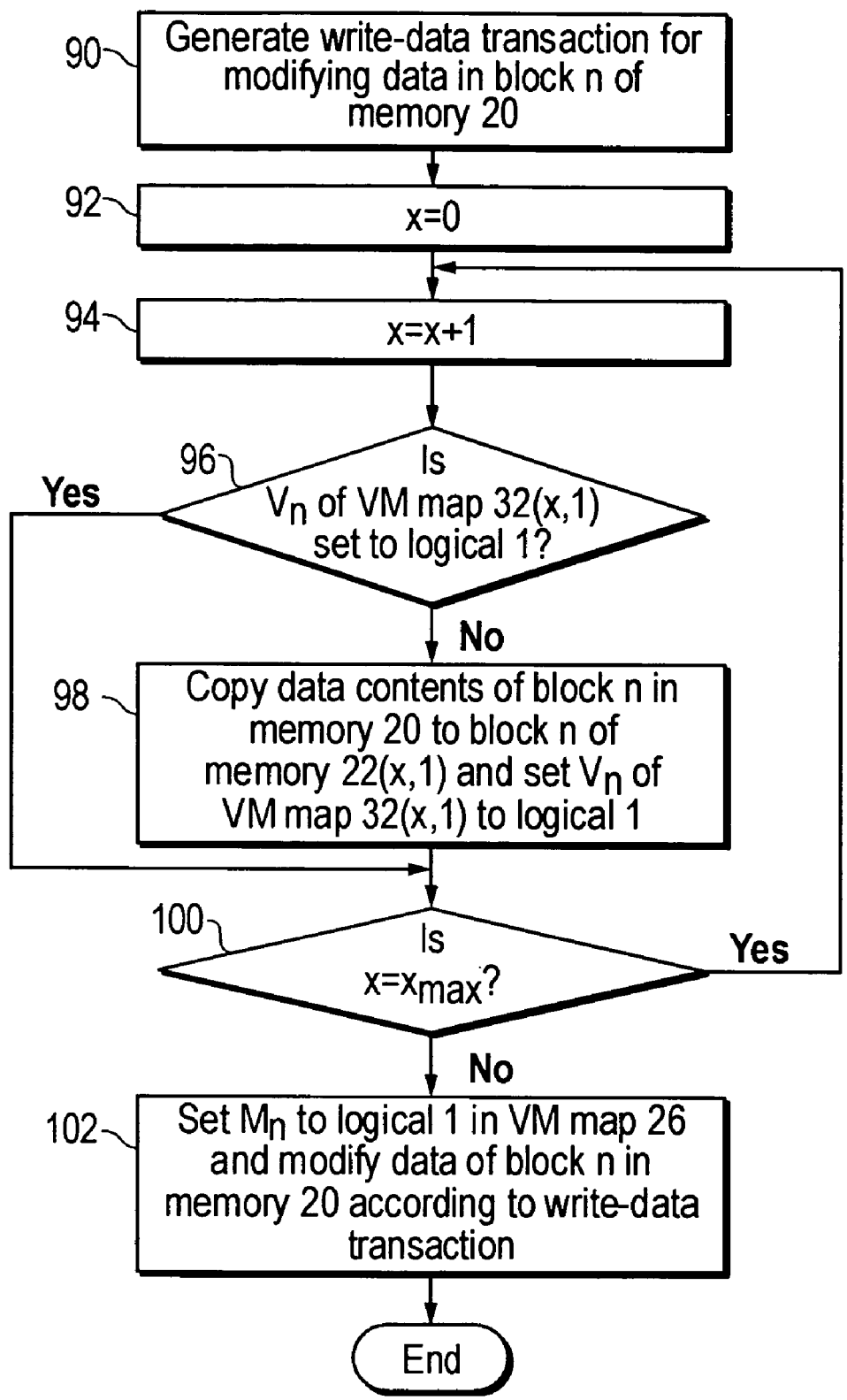
FIG. 9 is a flow chart illustrating operational aspects of writing or modifying data of the primary data volume.

Host node 12 can modify the data contents of primary data volume V or any PIT copy V(x,1) thereof (e.g., data volume V(1,1) or data volume V(2,1)) before any PIT copy in the hierarchy is transformed from the virtual state into the real state. FIG. 9 illustrates operational aspects implemented by host node 12 for modifying data in the primary data volume V after the creation of two or more PIT copies thereof. The process of FIG. 9 is a modified version of the COW process described in FIG. 4.

The process shown in FIG. 9 starts when host node 12 generates a write-data transaction for modifying data in block n of primary memory 20 as shown in step 90. In response, host node 12 sets variable x to 0 in step 92. In step 94, host node 12 increments x by 1. In step 96 host node 12 accesses VM map 32(x,1) to determine the state of $V_n$ therein. If $V_n$ is set to logical 0, then host node 12 copies the data contents of block n of primary memory 20 to block n of memory 22(x,1) and sets $V_n$ of VM map 32(x,1) to logical 1 as shown in step 98. After step 98 or in response to a determination that $V_n$ of VM map 32(x,1) is set to logical 1 in step 96, host node 12 compares x to $x_{max}$, the total number of PIT copies of the primary data volume V existing at the time. If x does not equal $x_{max}$ in step 100, steps 94-98 are repeated. Ultimately, in step 102, host node 12 modifies data of block n in primary memory 20 according to the write-data transaction generated in step 90, and host node 12 sets $M_n$ to logical 1 in VM map 26.

FIG. 7B illustrates the VM maps shown in FIG. 7A after implementing a write-data transaction in accordance with the process shown in FIG. 9. More particularly, FIG. 7B shows modification of VM maps of FIG. 7A after host node 12 implements a write-data transaction for modifying data in block 2 of the memory 20.

Host node 12 can create one or more a PIT copies of any PIT copy V(x,1) of the primary data volume. To illustrate, host node 12 creates a virtual PIT copy V(1,2) of data volume V(1,1) and a virtual PIT copy V(2,2) of data volume V(2,1). Host node 12 creates virtual volumes V(1,2) and V(2,2) by creating VM maps 32(1,2) and 32(2,2) shown in FIG. 10A. Initially each $V_n$ and $M_n$ entry in VM maps 32(1,2) and 32(2,2) are set to logical 0. Each entry in VM map 32(1,2) corresponds to a respective block n of memory 22(1,2). $V_n$ in VM map 32(1,2) indicates whether its corresponding block n in memory 22(1,2) contains valid data (e.g., a valid copy of data from block n of memory 22(1,1)). $M_n$ in VM map 32(1,2) indicates whether its corresponding block n in memory 22(1,2) contains data that has been modified since creation of data volume V(1,2). Similarly, each entry in VM map 32(2,2) corresponds to a respective block n of memory 22(2,2). $V_n$ in VM map 32(2,2) indicates whether its corresponding block n in memory 22(2,2) contains valid data (e.g., a valid copy of data from block n of memory 22(2,1)). $M_n$ in VM map 32(2,2) indicates whether its corresponding block n in memory 22(2,2) contains data that has been modified since creation of data volume V(2,2).

Figure 11:
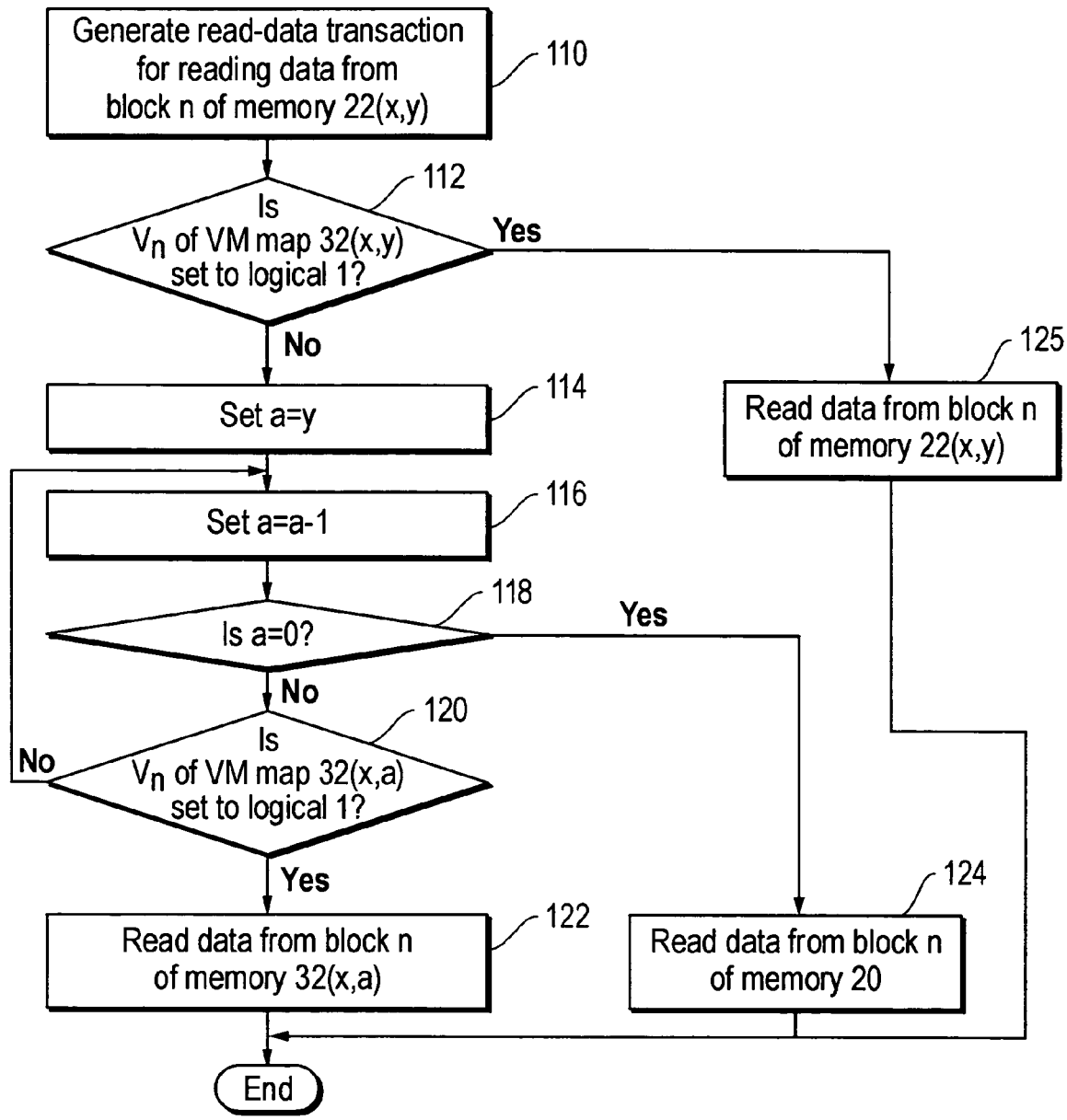
FIG. 11 is a flow chart illustrating operational aspects of reading data of any data volume within the hierarchy of data volumes.

Any virtual data volume V(x,y) in the hierarchy can be transformed into the real state using a background copying process performed by host node 12. Before data volume V(x,y) is transformed into a real data volume, host node 12 can read or modify the data contents of the primary data volume V or any other data volume of the hierarchy. FIG. 11 illustrates operational aspects of reading data from volume V(x,y) in accordance with one embodiment of the present invention. The process in FIG. 11 initiates when a read-data transaction is generated for reading data from block n of memory 22(x,y). Host node 12 accesses VM map 32(x,y) to determine whether block n of memory 22(x,y) contains valid data. More particularly, host node 12 checks the state of $V_n$ of VM map 32(x,y). If $V_n$ is set to logical 1, the data in block n of memory 22(x,y) is valid and subsequently read in step 125.

If $V_n$ is set to logical 0 in step 112, the data sought is not contained in memory 22(x,y) and must be retrieved elsewhere. In step 114 host node 12 sets a dummy variable a to y. In step 116, variable a is decremented by 1, and in step 118, host node 12 compares a to 0. If variable a is equal to 0, the data sought is contained in the primary data volume V and read accordingly as shown in step 124. If a does not equal 0 in step 118, host node accesses VM map 32(x,a) to determine whether block n of memory 22(x,y) contains a valid copy of data in block n. More particularly, host node 12 checks the state of $V_n$ of VM map 32(x,a). If $V_n$ is set to logical 1, the data in block n of memory 22(x,a) is valid and subsequently read as the data sought in step 122. If $V_n$ is set to logical 0 in step 122, steps 116 and 118 are repeated. Eventually, the data sought is read from a data volume V(x,a) or the primary data volume V and the process ends.

Figure 12:
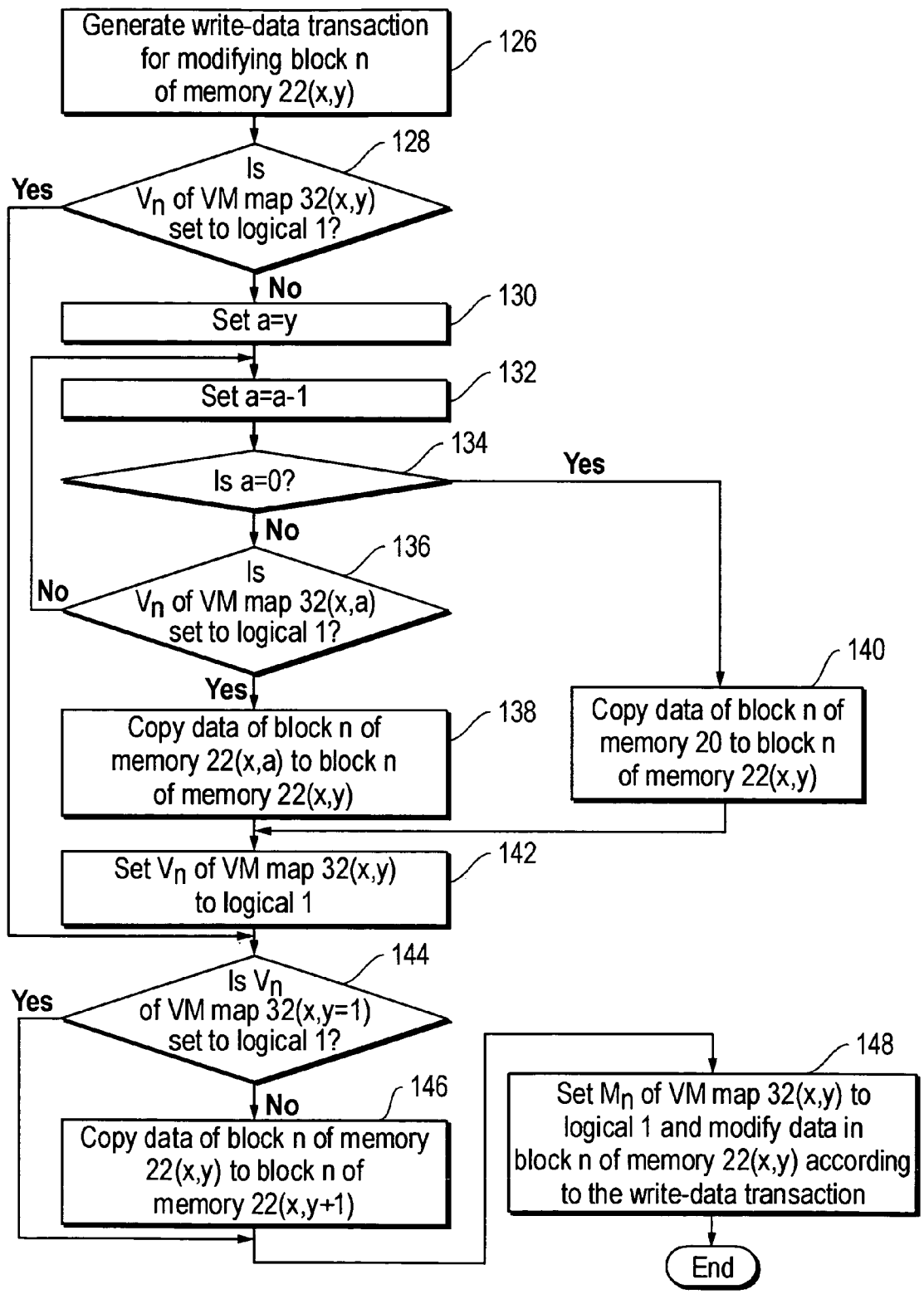
FIG. 12 is a flow chart illustrating operational aspects of modifying data of any data volume within the hierarchy of data volumes.

As noted, before data volume V(x,y) is transformed into a real data volume, host node 12 can modify the data contents of the primary data volume V or any other data volume of the hierarchy. The process of FIG. 12 illustrates operational aspects for modifying data of any volume V(x,y) in the hierarchy. The process shown in FIG. 12 implements a modified COW process. This process initiates with step 126 when host node 12 generates a write-data transaction for modifying data of block n of memory 22(x,y). Host node 12 won't perform this transaction unless memory 22(x,y) has a valid copy of data from block n of volume V(x,y−1), the volume from which volume V(x,y) depends. Accordingly, host node 12 first accesses VM map 32(x,y) to determine whether block n of memory 22(x,y) contains valid data. If $V_n$ is set to logical 0 in step 128, valid data is not contained in memory 22(x,y) and must be copied thereto. As will be explained the data is copied to memory 22(x,y) from a data volume from which volume V(x,y) depends directly (i.e., volume V(x,y−1)) or indirectly (e.g., V(x,y−2)).

In step 130 host node 12 sets a dummy variable a equal to y. In step 132, variable a is decremented by 1, and in step 134 host node 12 compares variable a to 0. If a is equal to 0, the data sought to be copied into memory 22(x,y) is contained in the primary data volume V and copied accordingly as shown in step 140. If variable a does not equal 0 in step 134, the process proceeds to step 138 where host node determines whether memory 22(x,a) contains the data sought to be copied into memory 22(x,y). More particularly, host node 12 accesses VM map 32(x,a) to determine whether block n of memory 22(x,a) contains valid data. If $V_n$ is set to logical 1, then data of block n in memory 22(x,a) is valid and subsequently copied to memory 22(x,y) in step 138. If $V_n$ is set to logical 0 in step 136, memory 22(x,a) does not contain valid data, and steps 132 and 134 are repeated. Eventually, data is copied to block n of memory 22(x,y), and in step 142, host node 12 sets $V_n$ of VM map 32(x,y) to logical 1.

After step 142 or in response to a determination that memory 22(x,y) contains a copy of valid data in step 128, host node checks all PIT copies of volume V(x,y) to make sure they have a valid copy of data in block n thereof. Host node 12 should not modify data in block n of volume V(x,y) until all PIT copies of volume V(x,y) have a copy of the data in block n thereof. For purposes of explanation, it is presumed that only one PIT copy (i.e., data volume V(x,y+1)) exists of volume V(x,y). Accordingly, in step 144, host node 12 accesses VM map 32(x,y+1) to determine the state of $V_n$. If $V_n$ is set to logical 0, block n in memory 22(x,y+1) lacks a valid copy of data in block n of memory 22(x,y), and in step 146 host node 12 copies data of block n of memory 22(x,y) to block n of memory 22(x,y+1). If $V_n$ is set to logical 1, then memory 22(x,y+1) contains a valid copy of block n data. Ultimately, host node sets $M_n$ to logical 1 in VM map 22(x,y) and modifies data in memory 22(x,y) according to the write-data transaction of step 126.

FIG. 10B illustrates the VM maps shown in FIG. 10A after modifying data according to the process described in FIG. 12. VM map 32(2,1) shows that data in block 3 of memory 22(2,1) has been modified, and that data in block 4 of memory 22(2,2) has been modified in accordance with FIG. 12.

Host node 12 can refresh any data volume $V(x_2,y_2)$, whether virtual or real, in the hierarchy to the contents of either the primary data volume V or another data volume $V(x_1,y_1)$, whether virtual or real, in the hierarchy such that the refreshed data volume $V(x_2,y_2)$ becomes a PIT copy of the data volume $V(x_1,y_1)$. For example, host node 12 can refresh volume V(2,1) in FIG. 10B to the contents of volume V(1,2). Host node 12 can refresh volume $V(x_2,y_2)$ to another volume regardless of whether there are one or more PIT copies of volume $V(x_2,y_2)$ in the hierarchy. Host node 12 can refresh a first volume in the hierarchy to the contents of a second volume where the first and second volumes are PIT copies of the same volume (e.g., primary volume V) of the hierarchy.

When a command is received or generated to refresh volume $V(x_2,y_2)$ to the contents of $V(x_1,y_1)$, host node 12, in one embodiment, preconditions volume $V(x_2,y_2)$ in preparation of the refresh operation to preserve $V(x_2,y_2)$ as a source of data for data volume $V(x_2,y_2+1)$ and any other PIT copy of volume $V(x_2,y_2)$. For purposes of explanation, it will be presumed that $V(x_2,y_2+1)$ is the only PIT copy of volume $V(x_2,y_2)$. The process shown in FIG. 13 illustrates one embodiment for preconditioning volume $V(x_2,y_2)$.

Figure 13:
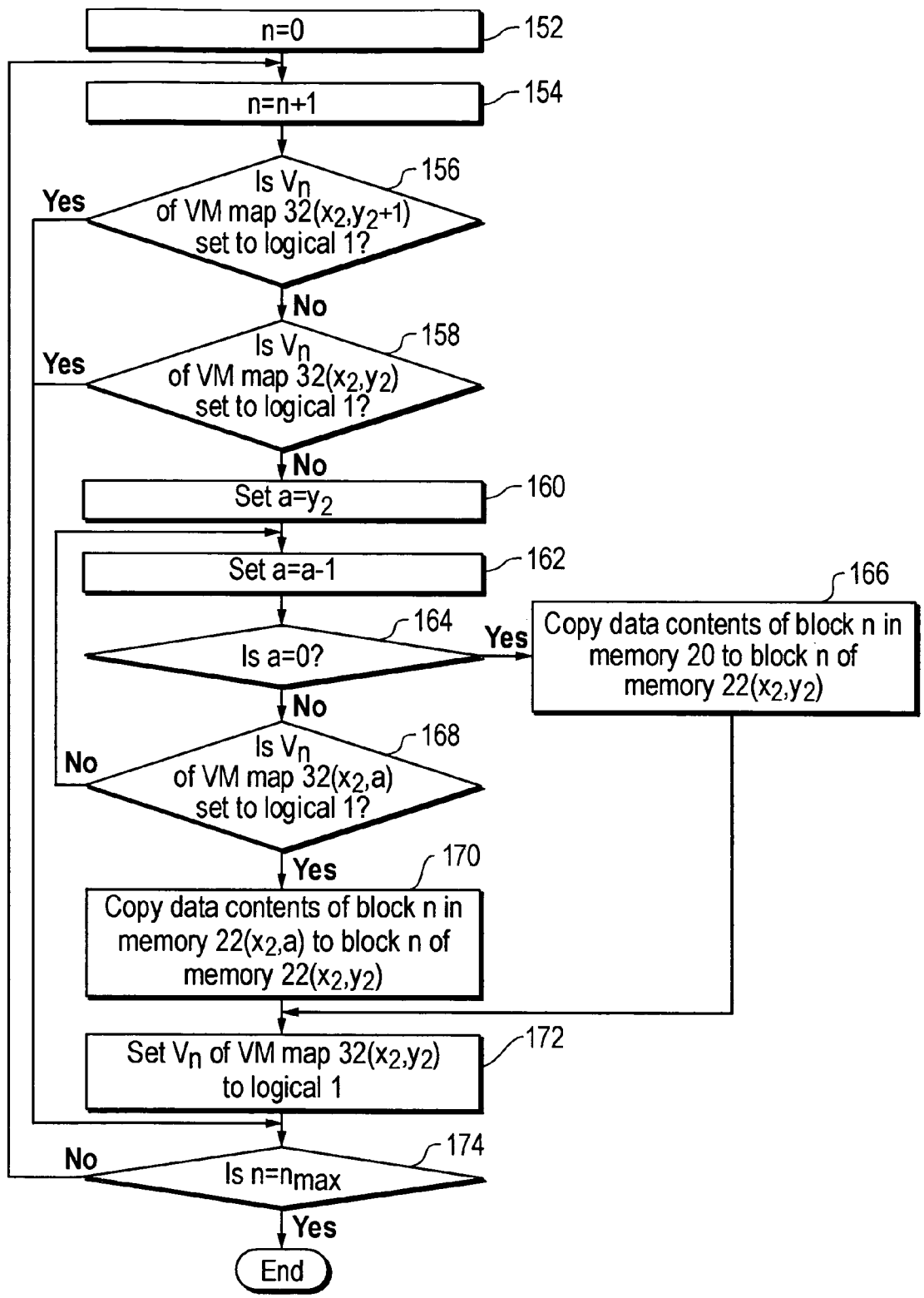
FIG. 13 is a flow chart illustrating operational aspects of preconditioning a data volume in the hierarchy that is to be refreshed to the contents of another data volume in the hierarchy.

The process in FIG. 13 begins with host node 12 setting n to 0 in step 152. N is then incremented by 1 in step 154.

Block n in memory $22(x_2,y_2+1)$ and/or $22(x_2,y_2)$ should have valid data before volume $V(x_2,y_2)$ is refreshed to the contents of volume $V(x_1,y_1)$. In steps 156 and 158, host node 12 accesses VM map $32(x_2,y_2+1)$ and/or VM map $32(x_2,y_2)$, respectively, to determine whether block n in memory $22(x_2,y_2+1)$ and/or $22(x_2,y_2)$ have a valid copy of data. If $V_n$ is set to logical 0 in both of the VM maps (i.e., no valid data in either memory $22(x_2,y_2+1)$ and $22(x_2,y_2)$), the process proceeds to identify data in the hierarchy that can be copied to block n of memory $22(x_2,y_2)$. In step 160 where host node 12 sets dummy variable a equal to $y_2$. In step 162, host node 12 decrements variable a by 1. In step 164, host node 12 compares variable a to 0. If a equals 0, then volume $V(x_2,y_2)$ is a PIT copy of the primary data volume V, and host node 12 copies the data contents of block n in memory 20 to block n of memory $22(x_2,y_2)$ as shown in step 166. If variable a does not equate with 0, then host node 12 accesses VM map $32(x_2,a)$ to determine the state of $V_n$. In step 168, if $V_n$ is set to logical 0, memory $22(x_2,a)$ lacks the data sought to be copied to memory $22(x_2,y_2)$, and steps 162 and 164 are repeated. If $V_n$ is set to logical 1, host node 12 in step 170 copies the data contents of block n in memory $22(x,a)$ to block n of memory $22(x_2,y_2)$. In response to step 166 or 170, host node 12 sets $V_n$ of VM map 32 $(x_2,y_2)$ to logical 1. It is noted that $V_n$ of VM map 32 $(x_2,y_2)$ may be set to logical 1 prior to steps 166 or 170 in an alternative embodiment.

After step 172 or in response to a determination in steps 156 or 158 that $V_n$ is set to logical 1 in VM map $32(x_2,y_2+1)$ or VM map $32(x_2,y_2)$, host node 12 compares n to $n_{max}$. If $n_{max}$ equal n, volume $V(x_2,y_2)$ is preconditioned and the process of FIG. 13 ends. Otherwise, the process repeats beginning with step 154.

Figures 10C, 10D:
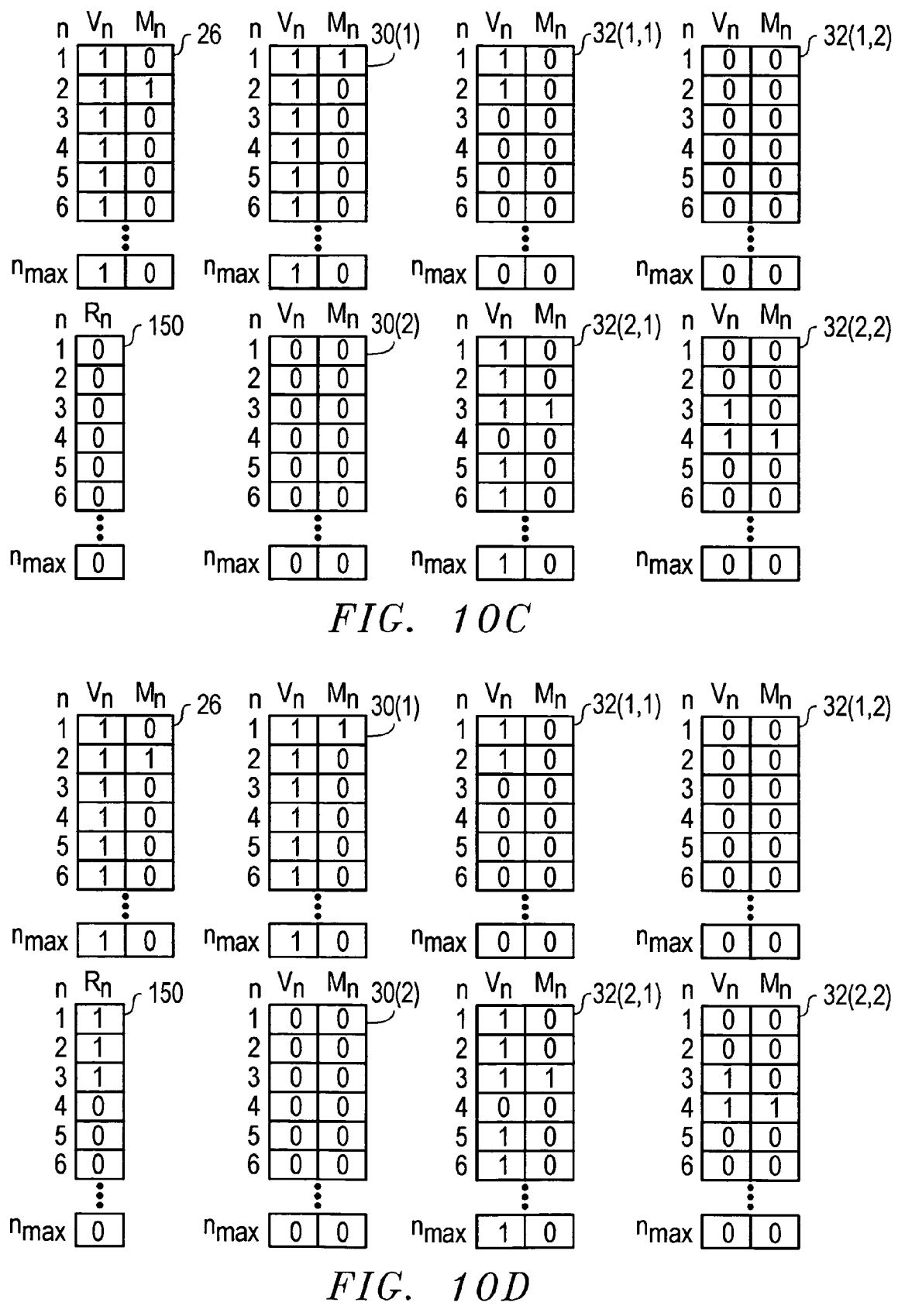

FIG. 10C illustrates VM map 32(2,1) of FIG. 10B after volume V(2,1) is preconditioned in accordance with the process shown in FIG. 13 in preparation to refresh volume V(2,1). VM map 32(2,1) shows all $V_n$ bits, except for $V_4$, are set to logical 1 thus indicating that all blocks in memory 22(2,1), except for block 4, contain valid data that can be copied to corresponding blocks of memory 22(2,2).

When a command is received or generated to refresh volume $V(x_2,y_2)$ to the contents of $V(x_1,y_1)$, host node 12, in one embodiment, creates a refresh map such as refresh map 150 shown in FIG. 10C. Refresh map 150 includes $n_{max}$ entries, each having one bit. Each $R_n$ entry corresponds to block n of memory $22(x_2,y_2)$. Initially, all entries $R_n$ of refresh map 150 are set to logical 0. $R_n$, depending upon its state, determines whether the corresponding block n of memory $22(x_2,y_2)$ is to be overwritten (i.e., refreshed) with new data during the refresh operation. More particularly, if $R_n$ is set to logical 1, then the contents of memory block n in memory $22(x_2,y_2)$ will be overwritten with data copied from another data volume during the refresh operation. However, if $R_n$ is set to 0, then block n of memory $22(x_2,y_2)$ will not be overwritten with data copied from another data volume.

Figure 14:
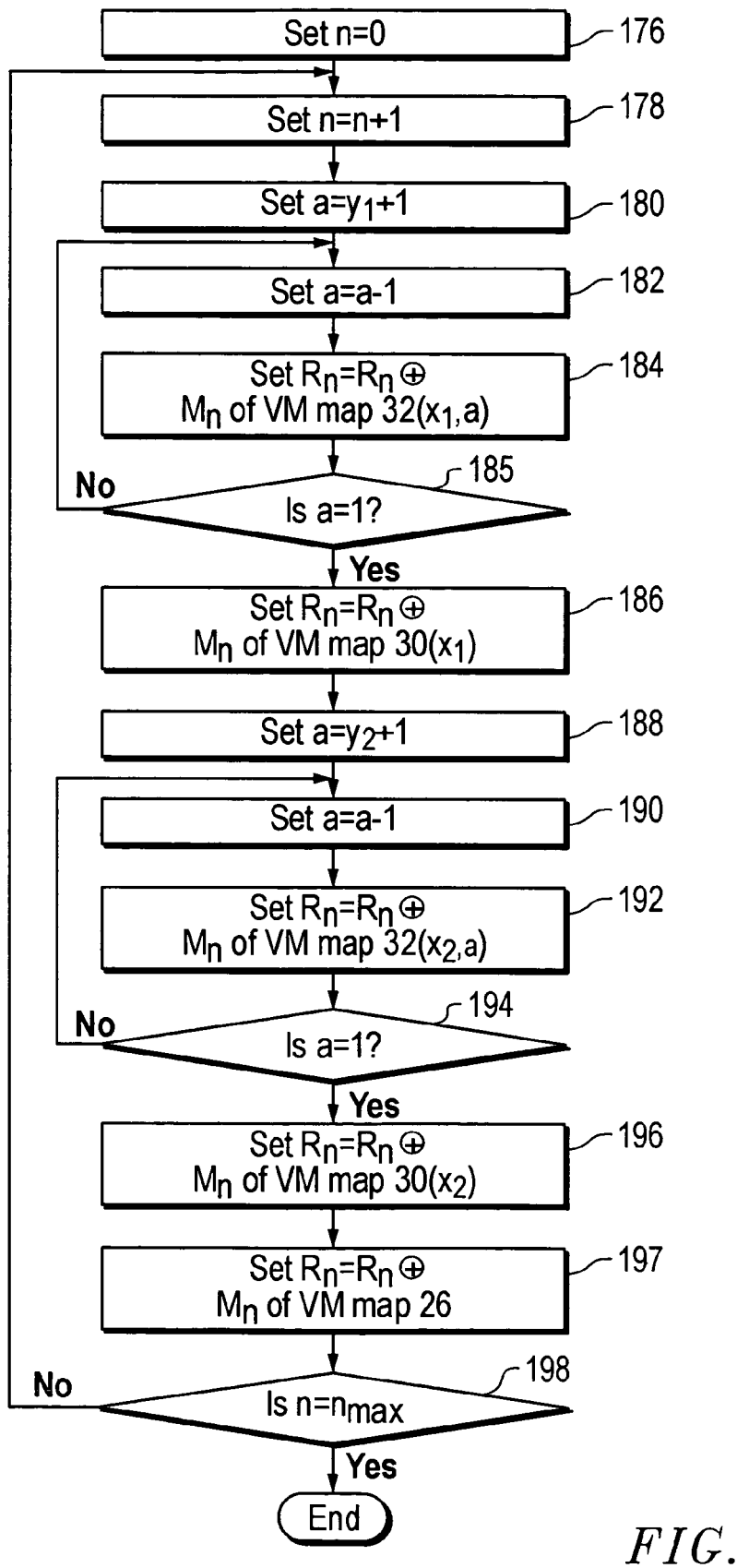
FIG. 14 is a flow chart illustrating operational aspects of setting the bits of the restore map.

Once the refresh map is generated, host node 12 calculates the state of each entry $R_n$ therein. FIG. 14 illustrates operational aspects of calculating the state of $R_n$ bits in the refresh map 150 according to one embodiment. More particularly, in step 176 host node 12 sets variable n to 0. In step 178, host node 12 increments n by 1. Host node 12 then sets a dummy variable a equal to $y_1+1$. After decrementing variable a by 1, host node 12 in step 184 logically ORs $R_n$ with $M_n$ of VM map $32(x_1,a)$, the result of which is stored in map 150 as the new $R_n$. In step 185, host node 12 compares variable a with 1. If a does not equal 1, then steps 182 and 184 are repeated. Eventually, variable a will compare equally to 1, and the process continues to step 186 where host node 12 logically ORs $R_n$ with $M_n$ of VM map $30(x_1)$, the result of which is stored in map 150 as the new $R_n$.

In step 188 host node 12 resets dummy variable a equal to $y_2+1$. Variable a is decremented in step 190, and in step 192 host node 12 logically ORs $R_n$ with $M_n$ of VM map $32(x_2,a)$, the result of which is stored in map 150 as the new $R_n$. In step 194, host node 12 compares variable a with 1. If a does not compare equally with 1, then steps 190 and 192 are repeated. When variable a equals 1 in step 194, the process continues to steps 196 and 197. In step 196, host node 12 logically ORs $R_n$ with $M_n$ of VM map $30(x_2)$, the result of which is stored in map 150 as the new $R_n$. In step 197, host node 12 logically ORs $R_n$ with $M_n$ of VM map 26, the result of which is stored in map 150 as the final calculated $R_n$. In step 198, host node 12 compares n to $n_{max}$. If n equals $n_{max}$ all entries of map 150 are calculated and the process of FIG. 14 ends. Otherwise, n is incremented in step 198 and steps 178-197 are repeated until n equals $n_{max}$.

FIG. 10D shows refresh map 150 of FIG. 10C after a command is generated to refresh volume V(2,1) to the contents of volume V(1,2) and after the entries are calculated in accordance with the process shown in FIG. 14. Entries 1-3 are set to logical 1 in the refresh map 150, thus indicating that blocks 1-3 of memory 22(2,1) are to be overwritten with data copied from another data volume during the refresh operation.

Figure 15:
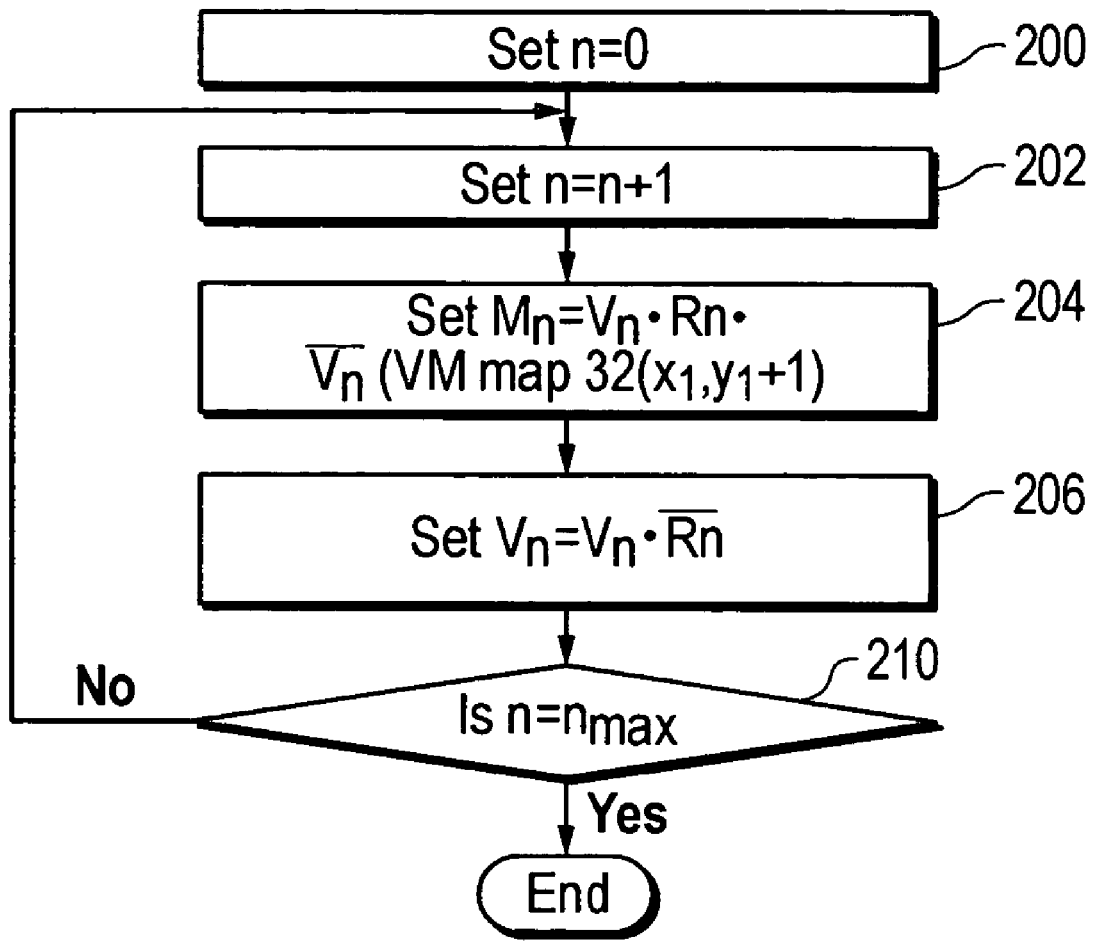
FIG. 15 is a flow chart illustrating operational aspects of encoding bits of a VM map corresponding to a volume to be refreshed to another volume.

After preconditioning volume $V(x_2,y_2)$ in accordance with the process of FIG. 13, and after calculating the entries of the refresh map in accordance with the process of FIG. 14, host node may encode the entries of VM map $32(x_2,y_2)$. VM map $32(x_2,y_2)$ entries are encoded to identify which blocks of memory $22(x_2,y_2)$ contain valid data of volume $V(x_2,y_2+1)$. After encoding VM map$(x_2,y_2)$, each entry takes one of three states: $V_n$=logical 0, $M_n$=logical 0; $V_n$=logical 1, $M_n$=logical 0; or $V_n$=logical 0, $M_n$=logical 1. VM map$(x_2,y_2)$ entry encoded to $V_n$=logical 0 and $M_n$=0 indicates that block n of memory $22(x_2,y_2)$ contains invalid data. VM map$(x_2,y_2)$ entry encoded to $V_n$=logical 1 and $M_n$=0 indicates that block n of memory $22(x_2,y_2)$ contains valid data of volume $V(x_2,y_2)$. VM map$(x_2,y_2)$ entry encoded to $V_n$=logical 1 and $M_n$=0 indicates that block n of memory $22(x_2,y_2)$ contains valid data of volume $V(x_2,y_2+1)$. FIG. 15 illustrates a process for encoding the entries of VM map$(x_2,y_2)$.

Figures 10E, 10F:
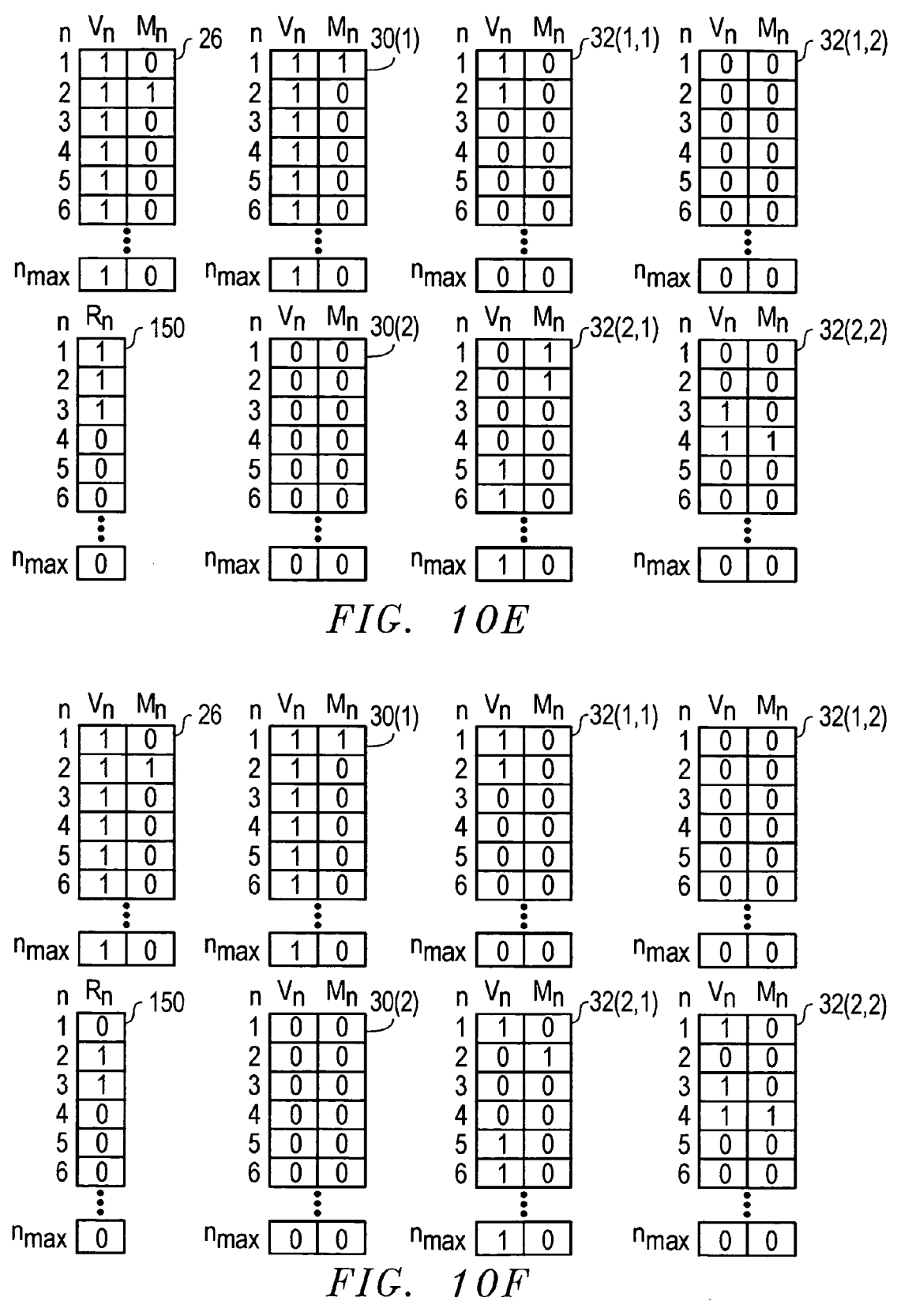

As shown in FIG. 15, host node 12 sets variable n to 0 in step 200. In step 202, host node increments n by 1. In step 204, host node 12 logically ANDs $R_n$ with $V_n$ of VM map $32(x_2,y_2)$ and the inverse of $V_n$ of VM map $32(x_2,y_2+1)$, the result of which is stored as the new $M_n$ of VM map $32(x_2,y_2)$. It is noted that if there is more than one PIT copy of volume $V(x_2,y_2)$, $M_n$ would be calculated in step 202 by logically ANDing $R_n$ with $V_n$ of VM map $32(x_2,y_2)$ and the inverse of all $V_n$ bits of the PIT copies. After step 204, host node 12 logically ANDs the current $V_n$ of VM map $32(x_2,y_2)$ with the inverse of $R_n$, the result of which is stored as the new $V_n$ of VM map $32(x_2,y_2)$ as shown in step 206. Steps 204 and 206 are repeated for each entry in VM map $32(x_2,y_2)$. Accordingly, in step 210 if n does not equal $n_{max}$, steps 202-206 are repeated. FIG. 10E shows VM map 32(2,1) of FIG. 10D after performing the process of FIG. 15.

Figure 16:
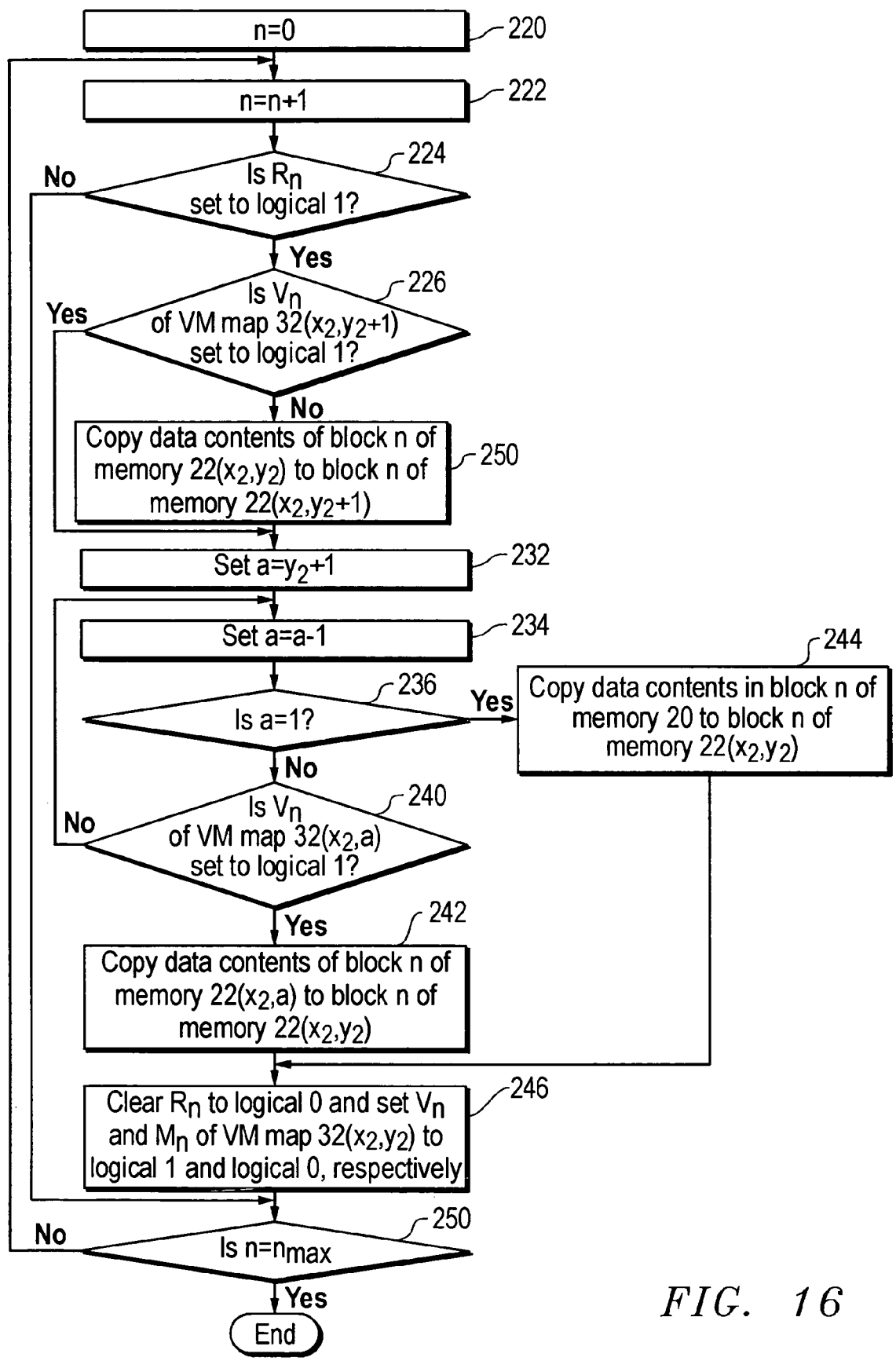
FIG. 16 illustrates operational aspects of a background copying process.

After the process in FIG. 15, data volume $V(x_2,y_2)$ can be fully transformed into a PIT copy of volume $V(x_1,y_1)$ using, for example, a background copying process described in FIG. 16. The process in FIG. 16 begins with host node 12 setting variable n to 0 in step 220. Thereafter, host node increments n by 1. $R_n$ of refresh map 150 determines whether block n of memory $22(x_2,y_2)$ is to be overwritten with data copied from another data volume such as data volume $V(x_1,y_1)$. If $R_n$ is set to logical 1 in step 224, block n will be overwritten with new data at some point during the process of FIG. 16. Before block n of memory $22(x_2,y_2)$ is overwritten, memory $22(x_2,y_2+1)$ should be checked to see if it has a valid copy of data in block n thereof. $V_n$ of VM map $32(x_2,y_2+1)$ determines whether block n of memory $22(x_2,y_2+1)$ has valid data. If $V_n$ of VM map $32(x_2,y_2+1)$ is set to logical 0 (i.e., the data in block n is not valid), then host node 12 copies the data contents in block n of memory $22(x_2,y_2)$ to block n of memory $22(x_2,y_2+1)$ and sets $V_n$ of VM map $32(x_2,y_2+1)$ to logical 1, as shown in step 230. If in step 226 host node 12 determines that $V_n$ is set to logical 1, the process proceeds to step 232.

Beginning with step 232, host node 12 performs a sub process to identify the data used to overwrite data in block n of memory $22(x_2,y_2)$. In step 232, host node 12 sets variable a to $y_1+1$. This variable is subsequently decremented in step 234. In step 236, host node 12 compares variable a to 1. If variable a is equal to 1 in step 236, volume $V(x_1,y_1)$ is a PIT copy of the primary data volume V, and in step 244 host node 12 copies the data content in block n of memory 20 to block n of memory $22(x_2,y_2)$. If volume $V(x_2,y_2)$ is not a PIT copy of primary volume V, variable a will not be equal to 1 in step 236, and the process proceeds to step 240 where host node 12 compares $V_n$ VM map $32(x_1,a)$ to logical 1. If $V_n$ equals logical 1, then volume $V(x_1,a)$ contains a valid copy of the data sought, and in step 242 host node 12 overwrites the data contents of block n of memory 22 $(x_2, y_2)$ with data copied from block n of memory $22(x_1,a)$. If, however, $V_n$ does not equal logical 1 in step 240, the subprocess repeats beginning with step 234.

After data is copied to block n of memory 22 $(x_2,y_2)$ in step 242 or in step 244, the process proceeds to step 246 where host node clears $R_n$ to logical 0 and sets $V_n$ and $M_n$ of VM map 32 $(x_2,y_2)$ to logical 1 and logical 0, respectively. In process step 250, the current value of variable n is compared to $n_{max}$. If n equates to $n_{max}$, then the refresh operation on volume $V(x_2,y_2)$ has finished, and volume of $V(x_2,y_2)$ is transformed into a PIT copy of volume $V(x_1,y_1)$. If n does not equate equally to $n_{max}$ in step 250, the process shown in FIG. 16 is repeated beginning with step 222 where n is incremented by 1.

FIG. 10F illustrates the state of VM map 32(2,1) in FIG. 10E after performing the first iteration (i.e., n set to 1) of the process. More particularly, $V_n$ in VM map 32(2,2) is set to 1 after data from memory block 22 (2,1) is copied to memory block 1 of memory 22 (2,2) in accordance with step 230 and the $V_1$ and $M_1$ bits of VM map 32(2,1) are set to logical 1 and logical 0, respectively, after data is copied from block 1 of memory 22(1,1) to memory 22 (2,1) in accordance with process steps 232-240 of FIG. 16.

Figure 17:
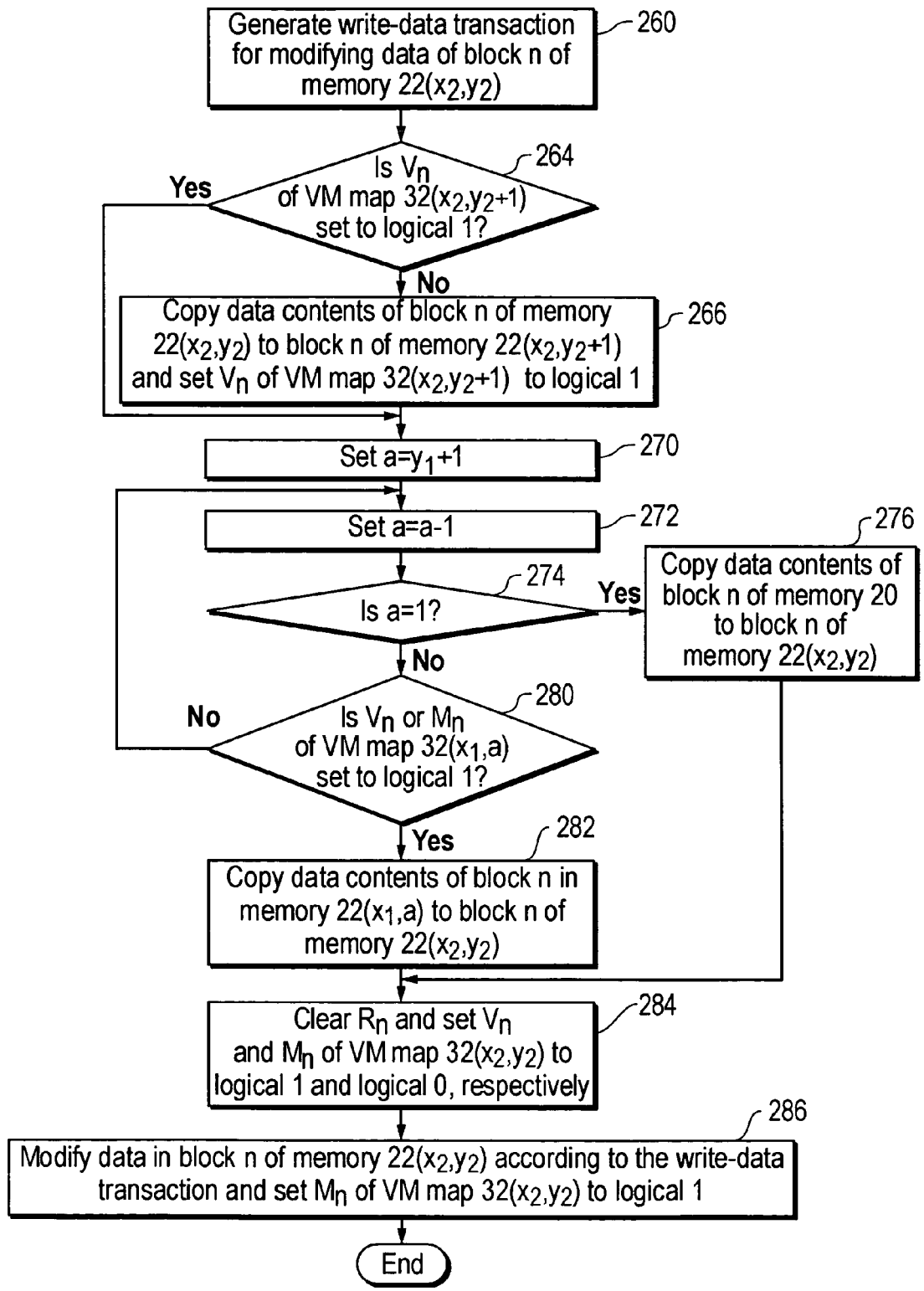
FIG. 17 is a flow chart illustrating operational aspects of writing or modifying data of a data volume while the data volume is being refreshed to the contents of another data volume.

Host node 12 can read or modify data of volume $V(x_1,y_1)$, volume $V(x_2,y_2)$, or any PIT copy of volume $V(x_2,y_2)$ after the refresh command is generated, but before $V(x_2,y_2)$ is fully transformed into a PIT copy of volume $V(x_1,y_1)$ in accordance with the process of FIG. 16. Host node 12 can modify the contents of data volume $V(x_1,y_1)$, $V(x_2,y_2)$, or any PIT copy of $V(x_2,y_2)$, regardless of whether one or all of these data volumes are in the virtual state. For purposes of explanation, it is presumed that volume $V(x_2,y_2+1)$ is the only PIT copy of volume $V(x_1,y_1)$, it being understood that the present invention should not be limited thereto. FIG. 17 illustrates operational aspects of modifying volume $V(x_2, y_2)$. The process shown in FIG. 17 initiates when host node 12 generates a write-data transaction for modifying data of block n of memory $22(x_2,y_2)$. Before block n is modified, the PIT copy of volume V $(x_2,y_2+1)$ is checked to see if it contains a valid copy of data in block n. In step 264, if $V_n$ of VM map 32 $(x_2,y_2+1)$ is set to logical 0, then volume V $(x_2,y_2+1)$ does not have a valid copy of data in block n. Accordingly, data is copied from block n of memory 22 $(x_2,y_2)$ to block in of memory $22(x_2,y_2+1)$ and host node 12 sets $V_n$ of VM map 32 $(x_2,y_2+1)$ to logical 1 as shown in step 266. Thereafter, or in response to a determination in step 264 that $V_n$ is set to logical 1, host node 12 executes a sub process to identify the source of the data to be written to block n of memory $22(x_2,y_2)$. This sub process initiates with step 270 when host node 12 sets variable a to $y_1+1$. In steps 272 and 274, host node 12 decrements variable a by 1 and subsequently compares variable a to 1. If variable 1 is equal to 1, then volume $V(x_1,y_1)$ is a PIT copy of the primary data volume V, and as a result, host node 12 copies the data content of block n of memory to block n of memory 22 $(x_2,y_2)$ as shown in step 276. If variable a does not equal 1 in step 274, host node compares $V_n$ and $M_n$ of VM map $32(x_1,a)$ to logical 1 as shown in step 280. If $V_n$ of $M_n$ equals logical 1, the source of data to be copied is contained in memory $22(x_1,a)$ Accordingly, in step 282 host node 12 copies the data contents of block n in memory $22(x_1,a)$ to block n of memory 22 $(x_2,y_2)$. If, however, $V_n$ and $M_n$ are set to logical 0 in step 280, the subprocess reiterates beginning with step 272.

After step 282 or step 276, host node 12 clears $R_n$ to logical 0 and sets $V_n$ and $M_n$ of VM map $32(x_2,y_2)$ to logical 1, and logical 0, respectively. Thereafter host node 12 modifies data in block n of memory $22(x_2,y_2)$ according to the write-data transaction generated in step 260 and sets $M_n$ of VM map $32(x_2,y_2)$ to logical 1 as shown in step 286.

FIG. 10G illustrates the VM maps of FIG. 10F after host node 12 modifies the contents of block 2 of memory 22(2,1) according to the process of FIG. 17. Before this data modification, the contents of block 2 of memory (2,1) are copied to block 2 of memory 22(2,2) and host node 12 overwrites the contents of block 2 in memory 22(2,1) with the contents of block 2 of memory 20. Once the new data of block 2 was modified, host node 12 sets $M_n$ of VM map 32(2,1) to logical 1 and cleared $R_3$ of refresh map 150.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:
1. A method in a data processing system, comprising:
creating data volumes $V_{1,1}$-$V_{1,n}$ wherein data volume $V_{1,1}$ is created as a point-in-time (PIT) copy of a volume V, and wherein each data volume $V_{1,x}$ of data volumes $V_{1,2}$-$V_{1,n}$ is created as a PIT copy of data volume $V_{1,x-1}$;
creating data volumes $V_{2,1}$-$V_{2,m}$ wherein data volume $V_{2,1}$ is created as a PIT copy of the volume V, and wherein each data volume $V_{2,y}$ of data volumes $V_{2,2}$-$V_{2,m}$ is created as a PIT copy of data volume $V_{2,y-1}$;
generating a refresh instruction for refreshing the data contents of data volume $V_{2,y}$ to the data contents of one of the data volumes $V_{1,1}$-$V_{1,n}$.
2. The method of claim 1 wherein volume V is a primary data volume.

3. The method of claim 1 further comprising:
refreshing the data contents of data volume $V_{2,y}$ to the data contents of one of the data volume $V_{1,1}$-$V_{1,n}$.

4. The method of claim 3 further comprising:
modifying data of $V_{2,y}$ in accordance with a write instruction before $V_{2,y}$ is refreshed to the data contents of one of the data volume $V_{1,1}$-$V_{1,n}$.

5. The method of claim 1 further comprising:
copying data from one of the data volumes $V_{1,1}$-$V_{1,n}$ to data volume $V_{2,y}$ in response to generation of a refresh instruction.

6. The method of claim 1 wherein each of data volumes $V_{1,1}$-$V_{1,n}$ and $V_{2,1}$-$V_{2,m}$ are initially created as virtual PIT copies.

7. A computer readable medium storing instructions executable by a computer system, wherein the computer system implements a method in response to executing the instructions, the method comprising:
creating data volumes $V_{1,1}$-$V_{1,n}$ wherein data volume $V_{1,1}$ is created as a point-in-time (PIT) copy of a primary data volume V, and wherein each data volume $V1,x$ of data volumes $V_{1,2}$-$V_{1,n}$ is created as a PIT copy of data volume $V_{1,x-1}$;
creating data volumes $V_{2,1}$-$V_{2,m}$ wherein data volume $V_{2,1}$ is created as a PIT copy of the primary data volume V, and wherein each data volume $V_{2,y}$ of data volumes $V_{2,2}$-$V_{2,m}$ is created as a PIT copy of data volume $V_{2,y-1}$;
generating a refresh instruction for refreshing the data contents of data volume $V_{2,y}$ to the data contents of one of the data volumes $V_{1,1}$-$V_{1,n}$.

8. The computer readable medium of claim 7 wherein the method further comprises:
refreshing the data contents of data volume $V_{2,y}$ to the data contents of one of the data volumes $V_{1,1}$-$V_{1,n}$.

9. The computer readable medium of claim 7 wherein the method further comprises:
copying data from one of the data volumes $V_{1,1}$-$V_{1,n}$ to data volume $V_{2,y}$ in response to generation of the refresh instruction.

10. The computer readable medium of claim 7 wherein data volumes $V_{1,1}$-$V_{1,n}$ and $V_{2,1}$-$V_{2,m}$ are initially created as virtual PIT copies.

11. An apparatus comprising:
one or more memories for storing data volumes;
a circuit for creating data volumes $V_{1,1}$-$V_{1,n}$ and data volumes $V_{2,1}$-$V_{2,m}$ in the one or more memories, wherein the first circuit creates data volume $V_{1,1}$ as a point-in-time (PIT) copy of a primary data volume V, wherein the circuit creates data volume $V_{2,1}$ as a PIT copy of the primary data volume V, wherein each data volume $V_{1,x}$ of data volumes $V_{1,2}$-$V_{1,n}$ is created by the first circuit as a PIT copy of data volume $V_{1,x-1}$, and wherein each data volume $V_{2,y}$ of data volumes $V_{2,2}$-$V_{2,m}$ is created by the circuit as a PIT copy of data volume $V_{2,y-1}$;
a second circuit for generating a refresh instruction for refreshing the data contents of data volume $V_{2,y}$ to the data contents of one of the data volumes $V_{1,1}$-$V_{1,n}$.

12. A computer system comprising:
one or more memories for storing data volumes;
a computer system coupled to the one or more memories;
a memory for storing instructions executable by the computer system, wherein the computer system implements a method in response to executing the instructions, the method comprising:
creating data volumes $V_{1,1}$-$V_{1,n}$ in the one or more memories, wherein data volume $V_{1,1}$ is created as a point-in-time (PIT) copy of a primary data volume V, and wherein each data volume $V1,x$ of data volumes $V_{1,2}$-$V_{1,n}$ is created as a PIT copy of data volume $V_{1,x-1}$;
creating data volumes $V_{2,1}$-$V_{2,m}$ in the one or more memories, wherein data volume $V_{2,1}$ is created as a PIT copy of the primary data volume V, and wherein each data volume $V_{2,y}$ of data volumes $V_{2,2}$-$V_{2,m}$ is created as a PIT copy of data volume $V_{2,y-1}$;
generating a refresh instruction for refreshing the data contents of data volume $V_{2,y}$ to the data contents of one of the data volumes $V_{1,1}$-$V_{1,n}$.

* * * * *